(12) United States Patent
Andrei et al.

(10) Patent No.: US 11,216,917 B2
(45) Date of Patent: *Jan. 4, 2022

(54) VIDEO ENHANCEMENT USING A NEURAL NETWORK

(71) Applicant: Amazon Technologies, Inc., Seattle, WA (US)

(72) Inventors: Silviu Stefan Andrei, Kirkland, WA (US); Nataliya Shapovalova, Issaquah, WA (US); Walterio Wolfgang Mayol Cuevas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,355

(22) Filed: May 3, 2019

(65) Prior Publication Data

US 2020/0349681 A1 Nov. 5, 2020

(51) Int. Cl.
*G06T 5/00* (2006.01)
*G06K 9/00* (2006.01)

(52) U.S. Cl.
CPC .......... *G06T 5/005* (2013.01); *G06K 9/00664* (2013.01); *G06T 2207/10016* (2013.01); *G06T 2207/20192* (2013.01)

(58) Field of Classification Search
CPC ........... G06T 5/005; G06T 2207/20192; G06T 2207/10016; G06K 9/00664; H04N 5/367
See application file for complete search history.

(56) References Cited

U.S. PATENT DOCUMENTS

| 2011/0091127 | A1* | 4/2011 | Kisilev | G06T 5/002 382/274 |
| 2017/0272798 | A1* | 9/2017 | Navarrete Michelini | H04N 21/2662 |
| 2017/0345130 | A1* | 11/2017 | Wang | G06K 9/66 |
| 2018/0121767 | A1* | 5/2018 | Wang | G06N 3/04 |

(Continued)

FOREIGN PATENT DOCUMENTS

WO 20161132152 A1 8/2016

OTHER PUBLICATIONS

Non-Local ConvLSTM for Video Compression Artifact Reduction (Year: 2019).*

(Continued)

*Primary Examiner* — Nizar N Sivji
(74) *Attorney, Agent, or Firm* — Nicholson De Vos Webster & Elliott, LLP

(57) ABSTRACT

Techniques for enhancing an image are described. For example, a lower-resolution image from a video file may be enhanced using a trained neural network applying the trained neural network on the lower-resolution image to remove artifacts by removing artifacts by generating, using a layer of the trained neural network, a residual value based on the proper subset of the received image and at least one corresponding image portion of a preceding lower resolution image in the video file and at least one corresponding image portion of a subsequent lower resolution image in the video file, upscale the lower-resolution image using bilinear upsampling, and combine the upscaled received image and residual value to generate an enhanced image.

20 Claims, 24 Drawing Sheets

(56) References Cited

U.S. PATENT DOCUMENTS

2020/0125943 A1 4/2020 Copty
2020/0226423 A1 7/2020 Ngo Dinh

OTHER PUBLICATIONS

Learning a Deep Convolutional Network for Image Super-Resolution (Year: 2014).*
Fieldsend et al., "Pareto Evolutionary Neural Networks", IEEE Transactions on Neural Networks, vol. 16, No. 2, Mar. 2005, pp. 338-354.
International Search Report and Written Opinion, PCT App. No. PCT/US2020/031233, dated Jul. 15, 2020, 17 pages.
Jo et al., "Deep Video Super-Resolution Network Using Dynamic Upsampling FiltersWithout Explicit Motion Compensation", IEEE/CVF Conference on Computer Vision and Pattern Recognition, 2018, pp. 3224-3232.
Ex-Parte Quayle for U.S. Appl. No. 16/403,386, mailed Aug. 31, 2020, 9 pages.
Notice of Allowance for U.S. Appl. No. 16/403,386, dated Jan. 22, 2021, 5 pages.
Non-Final Office Action for U.S. Appl. No. 16/403,367, dated Oct. 8, 2020, 19 pages.
Ledig, Christian et al., "Photo-Realisitic Single Image Super-Resolution Using a Generative Adversarial Network," arxiv.org/pdf/1609.04802.pdf, May 25, 2017, 19 pages.
Cisco Visual Networking Index: 2020 Global Forecast Highlights, Feb. 2019, downloaded from https://www.cisco.com/c/dam/m/en_us/solutions/service-provider/vni-forecast-highlights/pdf/Global_2020_Forecast_Highlights.pdf, 5 pages.
Tears of Steel, Mango Open Movie Project, 2013, downloaded from https://mango.blender.com, 6 pages.
Liao, R. et al., "Video Super-Resolution Via Deep Draft-Ensemble Learning", Proc. ICCV, Dec. 2015, 9 pages.
Caballero, J. et al., "Real-Time Video Super-Resolution with Spatio-Temporal Networks and Motion Compensation", Proc. CVPR, Jul. 2017, 10 pages.
Dong, C. et al., "Image Super-Resolution Using Deep Convolutional Networks", IEEE Trans. Pattern Anal. Mach. Intell., vol. 38, No. 2, Feb. 2016, 14 pages.
Tao, X. et al., "Detail-Revealing Deep Video Super-Resolution", Proc. ICCV, Oct. 2017, 9 pages.
Sajjadi, M.S.M et al., "Frame-Recurrent Video Super-Resolution", Proc. CVPR, Jun. 2018, 9 pages.
Chu, M. et al., "Learning Temporal Coherence via Self-Supervision for GAN-Based Video Generation", ADM Trans. Graph., vol. 39, No. 4, Jul. 2020, 19 pages.
Lucas, A. et al., "Generative Adversarial Networks and Perceptual Losses for Video Super-Resolution", Proc. ICIP, Oct. 2018, 16 pages.
Perez-Pellitero, E. et al., "Photorealistic Video Super Resolution", Proc. ECCV Workshops, 2018, 15 pages.
Wang, T. et al., "Video-to-Video Synthesis", Proc. NeurIPS, 2018, 14 pages.
Kim, H. et al., "Attentive Neural Processes", Proc. ICLR, 2019, 18 pages.
Kim, S.D. et al., "A Deblocking Filter with Two Separate Modes in Block-Based Video Coding", IEEE Trans. Circuits Syst. Video Technol., vol. 9, No. 1, 1999, 8 pages.
List, P. et al., "Adaptive Deblocking Filter", IEEE Trans. Circuits Syst. Video Technol., vol. 13, No. 7, Jul. 2003, 6 pages.
Lu, G. et al., "Deep Kalman Filtering Network for Video Compression Artifact Reduction", Proc. ECCV, 2018, 17 pages.
Bao, W. et al., "MEMC-Net: Motion Estimation and Motion Compensation Driven Neural Network for Video nterpolation and Enhancement", IEEE Trans. Pattern Anal. Mach. Intell., vol. 43, No. 3, Mar. 2021, 16 pages.
Xue, T. et al., "Video Enhancement with Task-Oriented Flow", Int. J. Comput. Vis., vol. 127, No. 8, Aug. 2019.
Wang, X. et al., "EDVR: Video Restoration with Enhanced Deformable Convolutional Networks", Proc. CVPR Workshops, Jun. 2019, 10 pages.
Fang, R. et al., "Mutli-frame Quality Enhancement for Compressed Video", Proc. CVPR, Jun. 2018, 10 pages.
Wu, C.-Y. et al., "Video Compression Through Image Interpolation", Proc. ECCV, 2018, 16 pages.
Cheng, Z. et al., "Learning Image and Video Compression Through Spatial-Temporal Energy Compaction", Proc. CVPR, Jun. 2019, 10 pages.
Lu, G. et al., "DVC: An End-to-End Deep Video Compression Framework", Proc. CVPR, Jun. 2019, 10 pages.
Blau, Y. et al., "The Perception-Distortion Tradeoff", Proc. CVPR, Jun. 2018, 10 pages.
Blau, Y. et al., "Rethinking Lossy Compression: The Rate-Distortion-Perception Tradeoff", Proc. ICML, 2019, 11 pages.
Goodfellow, I. et al., "Generative Adversarial Nets", Proc. NeurIPS, 2014, 9 pages.
Bampis, C.G. et al., "Towards Perceptually Optimized End-to-End Adaptive Video Streaming", arXiv:1808.03898, 2018, 16 pages.
Zhang, R. et al., "The Unreasonable Effectiveness of Deep Features as a Perceptual Metric", Proc. CVPR, Jun. 2018, 10 pages.
Wang, X. et al., "ESRGAN: Enhanced Super-Resolution Generative Adversarial Networks", Proc. ECCV Workshops, 2018, 16 pages.
Ma, C. et al., "Learning a No-Reference Quality Metric for Single-Image Super-Resolution", Comput. Vis. Image Understand, vol. 158, May 2017, 32 pages.
Mittal, A. et al., "Making a 'Completely Blind' Image Quality Analyzer", IEEE Signal Process Lett., vol. 20, No. 3, Mar. 2013, 4 pages.
Beyer, H.-G. et al., "Evolution Strategies—A Comprehensive Introduction", Natural Comput., vol. 1, No. 1, 2002, 50 pages.

* cited by examiner

VIDEO ENHANCEMENT USING A NEURAL NETWORK

BACKGROUND

Streaming video is usually compressed to reduce bandwidth. The quality of the compression and channel characteristics are determined by various factors including environmental factors and network congestion. These issues degrade the received image quality spatially and temporally inducing artifacts.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for enhancing one or more images are described. In particular, embodiments for removing compression artifacts and increasing video image resolution based on training convolutional neural networks are detailed. These embodiments may operate on steaming video, stored video, or on static images, and may help with at least a variety of low-quality video problems such as: a) low quality video that has occurred due to environmental circumstances; b) low quality video that was purposefully created to reduce the bandwidth to save data transfer; c) older videos that have been encoded with less quality or lower resolution; d) etc.

Figure 1:
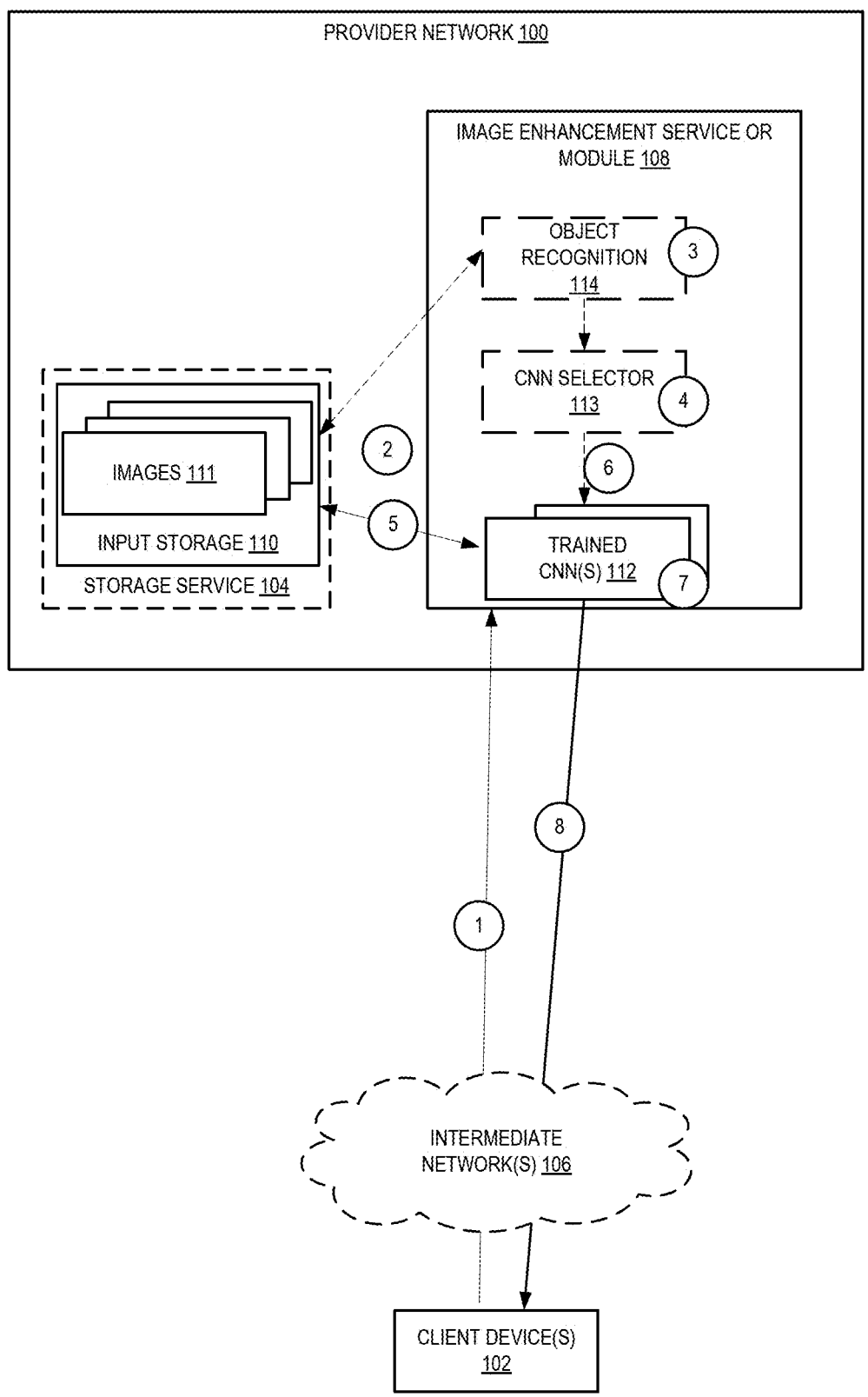
FIG. 1 is a diagram illustrating embodiments of an environment for enhancing images.

FIG. 1 is a diagram illustrating embodiments of an environment for enhancing images from still images or from a video. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

For example, in various embodiments, a "serverless" function may include code provided by a user or other entity that can be executed on demand Serverless functions may be maintained within provider network 100 and may be associated with a particular user or account, or may be generally accessible to multiple users and/or multiple accounts. Each serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an application programming interface ("API") call or a specially formatted HyperText Transport Protocol ("HTTP") request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, a customer can access an image enhancement service or module 108 in provider network 100 using a client device 102. The client device 102 can access the image enhancement service or module 108 over one or more intermediate networks 106 through an interface provided by image enhancement service or module 108, such as an API, console, application, etc. In some embodiments, a user can upload one or more image files 111 to an input store 110 in a storage service 104. In some embodiments, the storage service may provide a virtual data store (e.g., a folder or "bucket", a virtualized volume, a database, etc.) provided by the provider network 100. The user may access the functionality of storage service 104, for example via one or more APIs, to store data to the input store 110.

The image enhancement service or module 108 includes at least one trained convolutional neural network (CNN) 112 and, in some embodiments, includes an object recognition module 114. The least one trained CNN 112 performs image enhancement on at least a proper subset of an image as will be detailed below. The object recognition module 114 finds one or more particular objects (such as visage recognition) in an image. In some embodiments, a CNN selector 113 uses an one or more of an input image (or a collection of them), a recognized object, the bandwidth available to the neural network (which may impact the initial resolution), processing power available, power, an acceptable latency, locality information for the image and/or destination viewer, memory available, lighting information for the image, screen resolution, etc. select a trained CNN 112 to perform the image enhancement.

The circled numerals illustrate an exemplary flow of actions. At numeral 1, the user sends a request to image enhancement service or module 108 to enhance one or more images. The request may include at least one of a location of the neural network (e.g., CNN 112) to use, a location of an image-based file (such as solo image file, a video file, etc.), a desired resolution, if object detection is to be used (and for what), etc. Additionally, a neural network 112 may have different profiles to utilize depending upon environmental factors such as processing power, power, etc.

At numeral 2, the image enhancement service or module 108 calls for images 111 (such as for a video) according to the request. Note that the input storage 110 may simply be a buffer and not a longer-term storage.

When object recognition is to be performed that occurs at numeral 3. Depending upon the implementation, the resultant proper subset of an image is provided to the trained CNN 112 at circle 5 or entire image is provided, but a selected trained CNN 12 is used for that subset and potentially a different trained CNN 112 is used for the rest of the image.

The trained CNN 112 may access additional image content (such as preceding and succeeding frames) at circle 6. The trained CNN 112 performs image enhancement at circle 7 and provides the result(s) to the client device(s) 102 at circle 8. Note, in some embodiments, an output of the CNN 112 per image (or proper subset thereof) is multiple images (or proper subsets thereof). For example, an image for $T_0$ and $T_{0.5}$ such that potentially a subsequent image in time may not need to be generated "from scratch."

Figure 2:
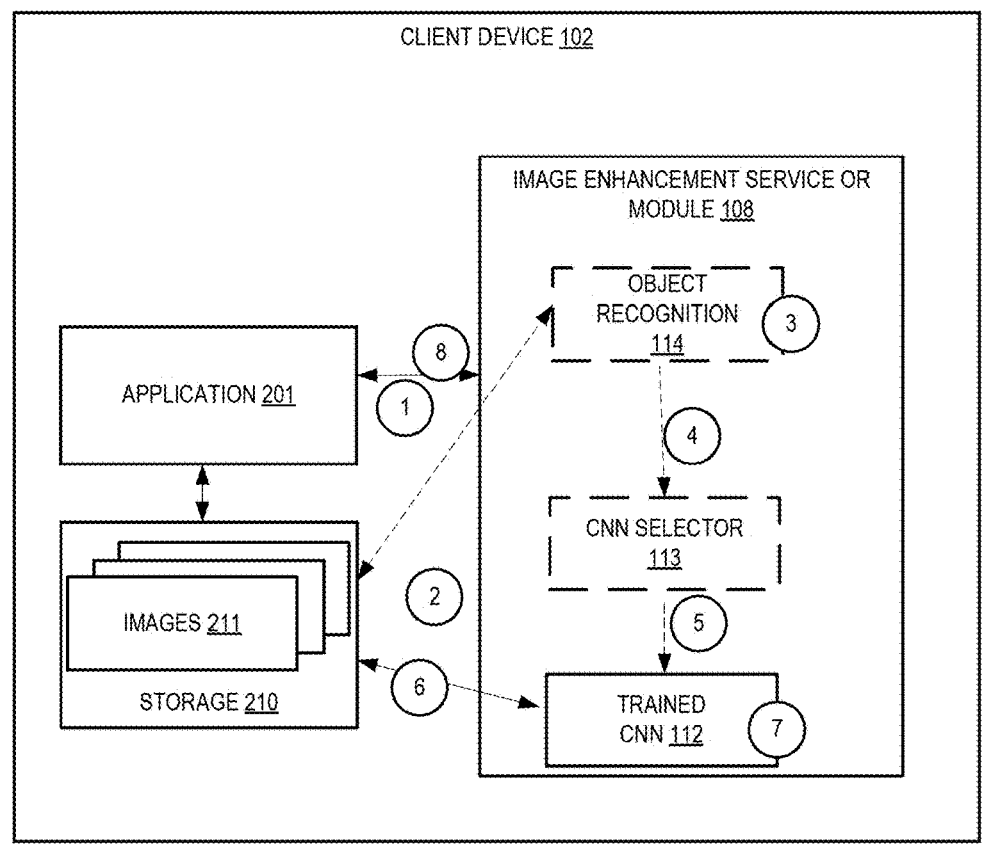
FIG. 2 is a diagram illustrating embodiments of an environment for enhancing images.

FIG. 2 is a diagram illustrating embodiments of an environment for enhancing images. In this example, the environment is a client device 102.

As shown in FIG. 2, an application 201 can access an image enhancement service or module 108. The image enhancement service or module 108 includes at least one trained convolutional neural network (CNN) 112 and, in some embodiments, includes an object recognition module 114. The least one trained CNN 112 performs image enhancement on at least a proper subset of an image of images 211 of storage 210 as will be detailed below. The object recognition module 114 finds one or more particular objects (such as a visage) in an image. In some embodiments, a CNN selector 113 uses an one or more of an input image (or a collection of them), a recognized object, the bandwidth available to the neural network (which may impact the initial resolution), processing power available, power, an acceptable latency, locality information for the image and/or destination viewer, lighting information for the image, screen resolution, etc. select a trained CNN 112 to perform the image enhancement.

The circled numerals illustrate an exemplary flow of actions. At numeral 1, the application 201 sends a request to image enhancement service or module 108 to enhance one or more images. The request may include at least one of a location of the neural network (e.g., CNN 112) to use, a location of an image-based file (such as solo image file, a video file, etc.), a desired resolution, if object detection is to be used (and for what), etc. Additionally, a neural network 112 may have different profiles to utilize depending upon environmental factors such as processing power, power, etc.

At numeral 2, the image enhancement service or module 108 calls for images 211 (such as for a video) according to the request. Note that the storage 210 may simply be a buffer and not a longer-term storage.

When object recognition is to be performed that occurs at numeral 3. Depending upon the implementation, the resultant proper subset of an image is provided to the trained CNN 112 at circle 5 or entire image is provided, but a selected trained CNN 12 is used for that subset and potentially a different trained CNN 112 is used for the rest of the image.

The trained CNN 112 may access additional image content (such as preceding and succeeding frames) at circle 6.

The trained CNN 112 performs image enhancement at circle 7 and provides the result(s) to the client device(s) 102 at circle 8.

Figure 3:
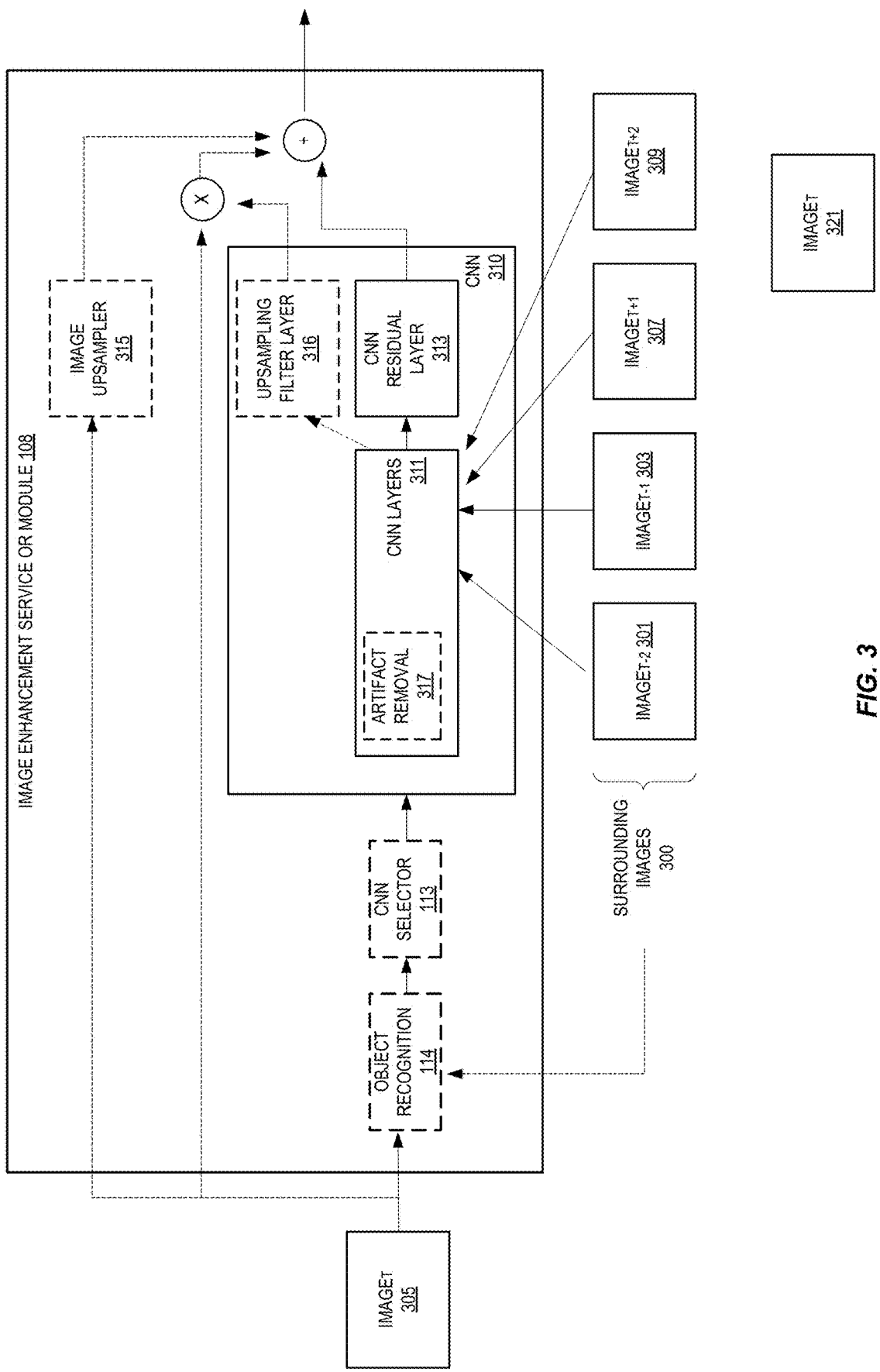
FIG. 3 illustrates embodiments of an image enhancement service or module to be used in inference.

FIG. 3 illustrates embodiments of an image enhancement service or module to be used in inference. The image enhancement service or module 108 is to be utilized to enhance one or more images, or proper subsets of images thereof, of a video in response to an inference request to do so. That image may be a part of a video stream or a stored video. In some embodiments, an image is a frame of video. Typically, although not necessarily the case, the video is of a lower quality (lower resolution, etc.).

The image enhancement service or module 108 may be used in many different environments. In some embodiments, the image enhancement service or module 108 is a part of a provider network (e.g., as a service) that can be called (such as shown in FIG. 1). In these embodiments, the image enhancement service or module 108 receives a video (streamed or stored), enhances some part of it as directed, and then makes that enhancement available (such as by storing it or transmitting it to a client device). In some embodiments, the image enhancement service or module 108 is a part of a client device (such as shown in FIG. 2). In these embodiments, the image enhancement service or module 108 receives a video (streamed or stored), enhances some part of it as directed, and then makes that enhancement available (such as by making available for display or storing for later playback).

In some embodiments, an object recognition module 114 finds one or more particular objects (such as a visage) in an input image 305 to be enhanced.

In some embodiments, a CNN selector 113 uses one or more of an input image (or a collection of them), a recognized object, the bandwidth available to the neural network (which may impact the initial resolution), processing power available, power, an acceptable latency, locality information for the image and/or destination viewer, lighting information for the image, screen resolution, etc. select a trained CNN 112 to perform the image enhancement.

In this illustration, the image enhancement service or module 108 includes a convolutional neural network (CNN) 310 comprised of a plurality of layers 311 which may include one or more of: 1) one or more convolutional layers, 2) one or more subsampling layers, 3) one or more pooling layers, 4) and other layers. The CNN layers 311 operate one an input image 305 (or a proper subset thereof) to be enhanced and one or more preceding 301-303 and succeeding images 307-309 (or a proper subset thereof in the video to be enhanced. Connected to these layers 311 is a CNN residual layer 313 that generates a residual value for the output of the CNN layers 313. The residual value removes or minimizes spatial and temporal compression artifacts produced by the video encoder that produced the image such as blocking, ringing, and flickering. In some embodiments, an artifact removal layer (or layers) 317 removes artifacts from the input image 305.

In some embodiments, the image enhancement service or module 108 also includes an image upsampler 315 (such as a bilinear upsampler) that upsamples the image to be enhanced. In some embodiments, the image is upsampled four times, however, other upsampling scales may be used. The upsampled image and the residual are summed to generate an enhanced image.

In some embodiments, the image enhancement service or module 108 includes an upsampling filter layer 316 in the CNN 310 that is coupled to the CNN layers 311 to upsample the image (or subset thereof). A tensor product of the upsampled image and the input image 305 is performed and then summed with the residual to generate an enhanced image.

Figure 4:
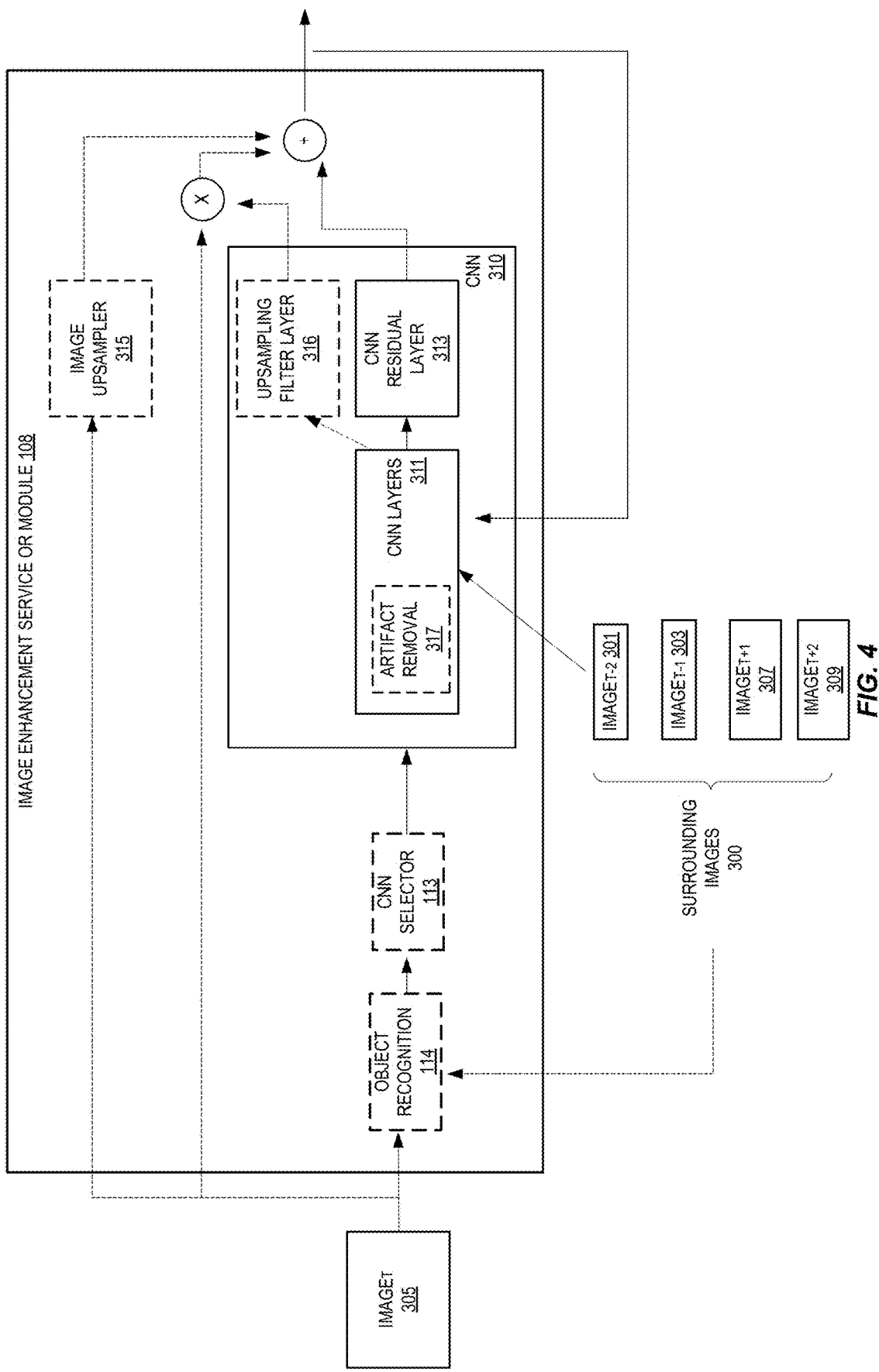
FIG. 4 illustrates embodiments of an image enhancement service or module to be used in inference that uses a more recurrent approach.

FIG. 4 illustrates embodiments of an image enhancement service or module to be used in inference that uses a more recurrent approach. In particular, a previous higher resolution image will be an input into the CNN 310 instead of a plurality of preceding 301-303 and succeeding 307-309 lower resolution images.

In some embodiments, for an initial image to enhance, the image enhancement service or module 108 does utilize a preceding and succeeding lower resolution images to generate a higher resolution image as detailed above (such as using either the image upsampler 315 or upsampling filter layer 316). This higher resolution image is then passed back as an input to the CNN 310 along with the image to enhance. The CNN 310 only utilizes the single lower resolution image and a previously generated higher resolution image in the generation of an enhanced image.

In other embodiments, the initial image to enhance is enhanced without any other input to the CNN 310, (e.g., the output of the CNN layers 311 and any other layers needed to generate an enhanced image). The result of that initial enhancement is then passed back in as an input to the CNN 310 along with the image to enhance. The CNN 310 only utilizes the single lower resolution image and the previously generated higher resolution image in the generation of an enhanced image. This approach reduces a number of frames to process and may be faster than the previously detailed approach. In some embodiments, an artifact removal layer (or layers) 317 removes artifacts from the input image 305.

Note the artifact removal module 317, object recognition module 114, and CNN selector 113 operate as previously described.

Figure 5:
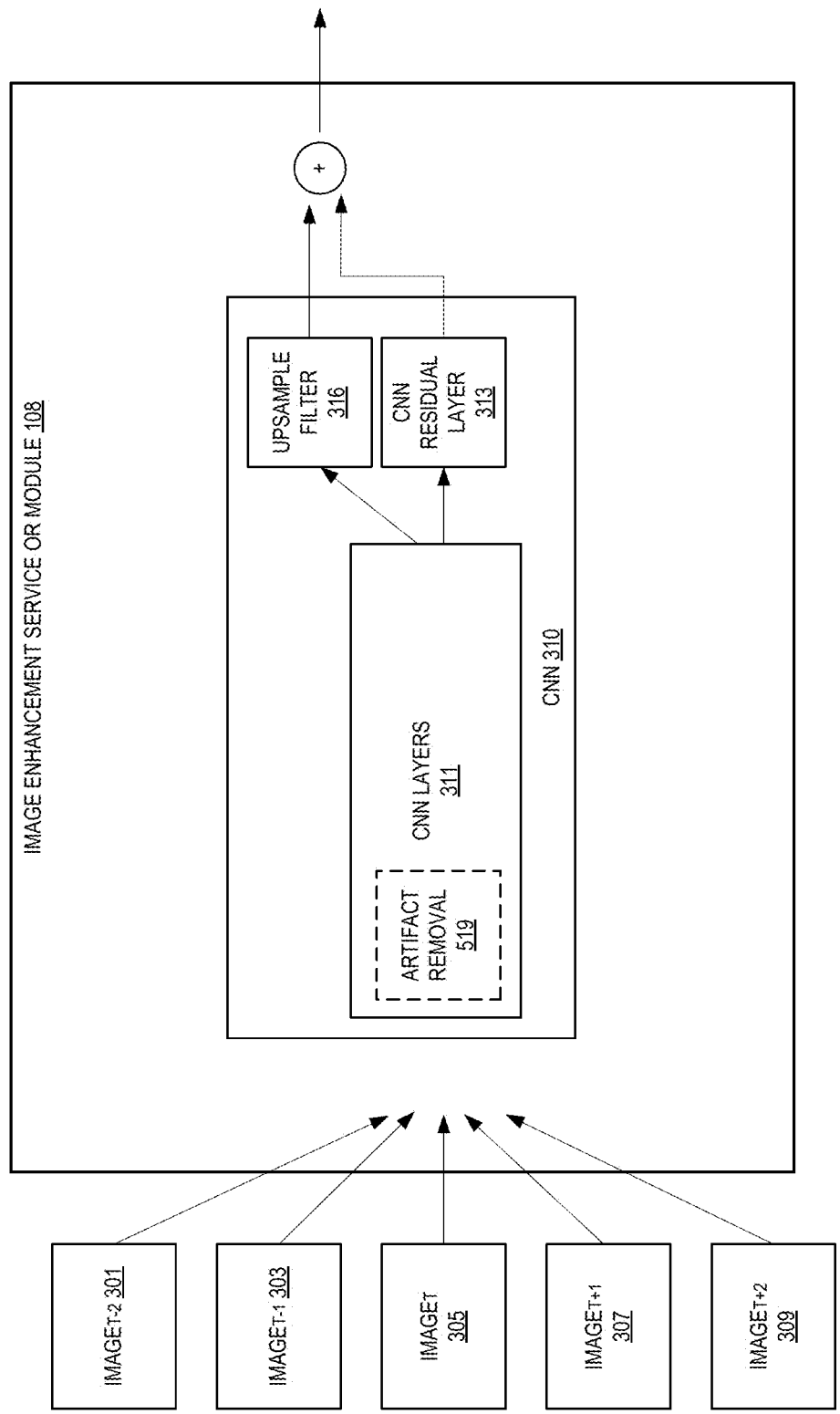
FIG. 5 illustrates embodiments of an image enhancement service or module during training.

Of course, prior to using a CNN for inference, it should be trained. FIG. 5 illustrates embodiments of an image enhancement service or module during training. Many aspects are shared between the inference versions detailed above, however, in some embodiments, there is at least one difference. In particular, the CNN layers 311 are shared by the CNN residual layer 313 detailed above and CNN filters 316. The CNN filters 316 perform the function of upsampling. During training, the CNN 310 utilizes those filters 316 instead of a separate upsampling function. Further, during training the entire CNN 310 is trained including the CNN filters 316 which are not used during inference (in some embodiments).

As streamed videos may lose sharpness and color vibrancy as signal is encoded and transmitted through the network, in some embodiments, an exaggerated target training images are used to promote the network to enhance sharpness and color on the output.

In some embodiments, the CNN 310 (or at least the CNN layers) is a component of a generative adversarial network (GAN). In particular, in these embodiments the CNN 310 is a generator component of a GAN. In some embodiments, an artifact removal layer (or layers) 317 removes artifacts from the input image 305.

Figure 6:
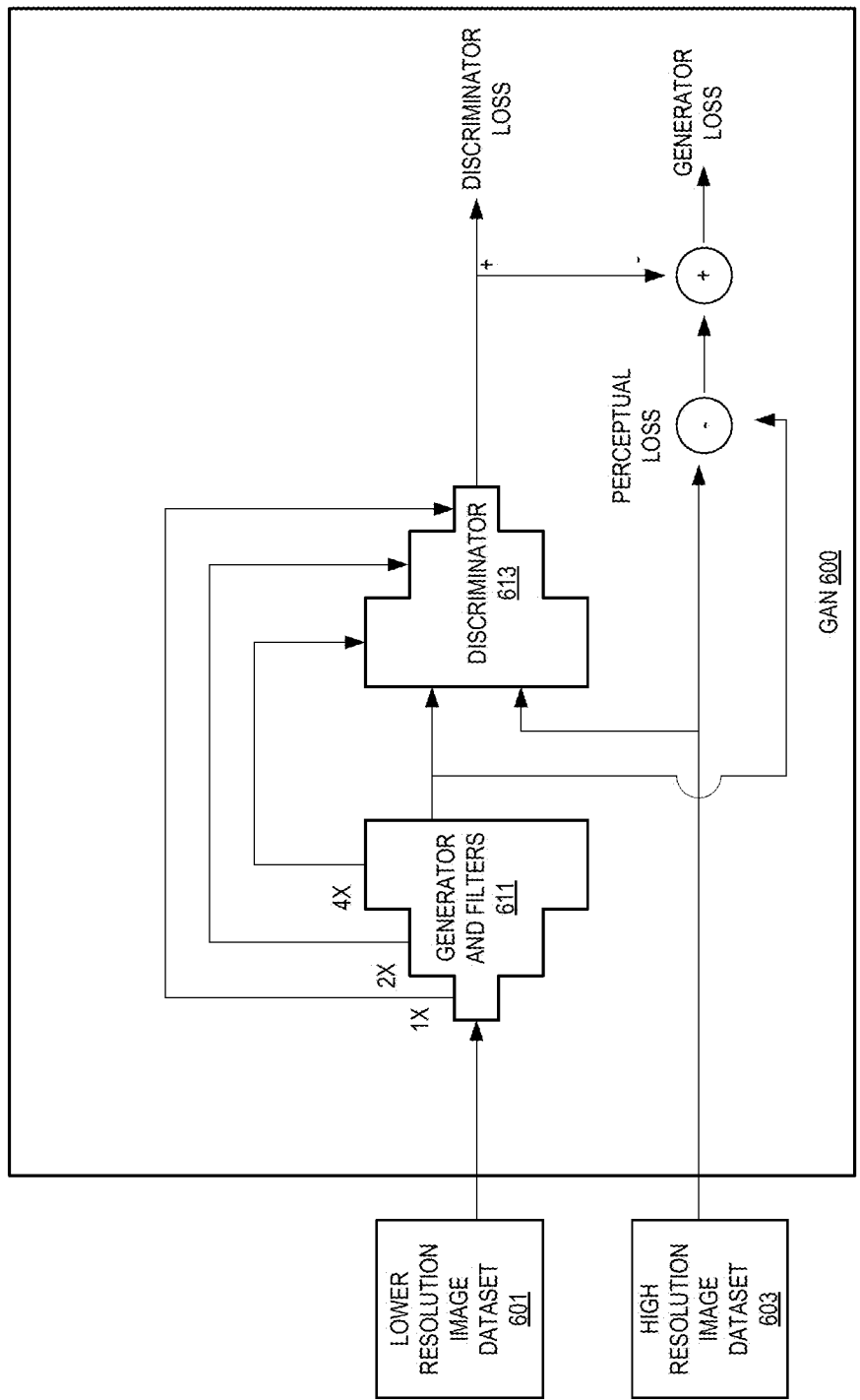
FIG. 6 illustrates embodiments of a GAN of which part may be used to generate enhanced images.

FIG. 6 illustrates embodiments of a GAN of which part may be used to generate enhanced images. As shown, the GAN 600 includes a generator with filters 611 and a discriminator 613. The generator with filters 611 are to produce a "fake" image from an image of a lower resolution image dataset 601 and the discriminator 613 is to compare the "fake" image to a corresponding higher resolution image from a higher resolution dataset 603 to determine if the image is "real" or "fake" (evaluates whether the generate image belongs in the training data set of higher resolution images or not). The output of the discriminator 613 is a probability that the generated image is fake. The discriminator 613 is a fully connected neural network. If the generator 611 is performing well (generating good "fakes") then the discriminator 613 will return a value indicating a higher probability of the generated images being real.

The constructed image of the generator with filters 611 is also subtracted from a corresponding image of the higher resolution image dataset 601 which indicates a perceptual loss. This perceptual loss is added to the output of the discriminator 613 to produce a generator loss which is fed back to the generator with filters 611 to update the weights of the generator with filters 611 to help train it. A discriminator loss is the inverse of the generator loss and is fed back to the discriminator 613 to update its weights. Note that in some embodiments the discriminator 613 and generator with filters 611 are trained in turns by first training one and then the other.

As streamed videos may lose sharpness and color vibrancy as signal is encoded and transmitted through the network, in some embodiments, an exaggerated target training image is used as the higher resolution image to promotes the network to enhance sharpness and color on the output.

In some embodiments, the output of the generator with filters 611 is added to an upsampled input image 305. In some embodiments, one or more of an object recognition module 114 and a CNN selector 113 are utilized and operate as previously described.

Figure 7:
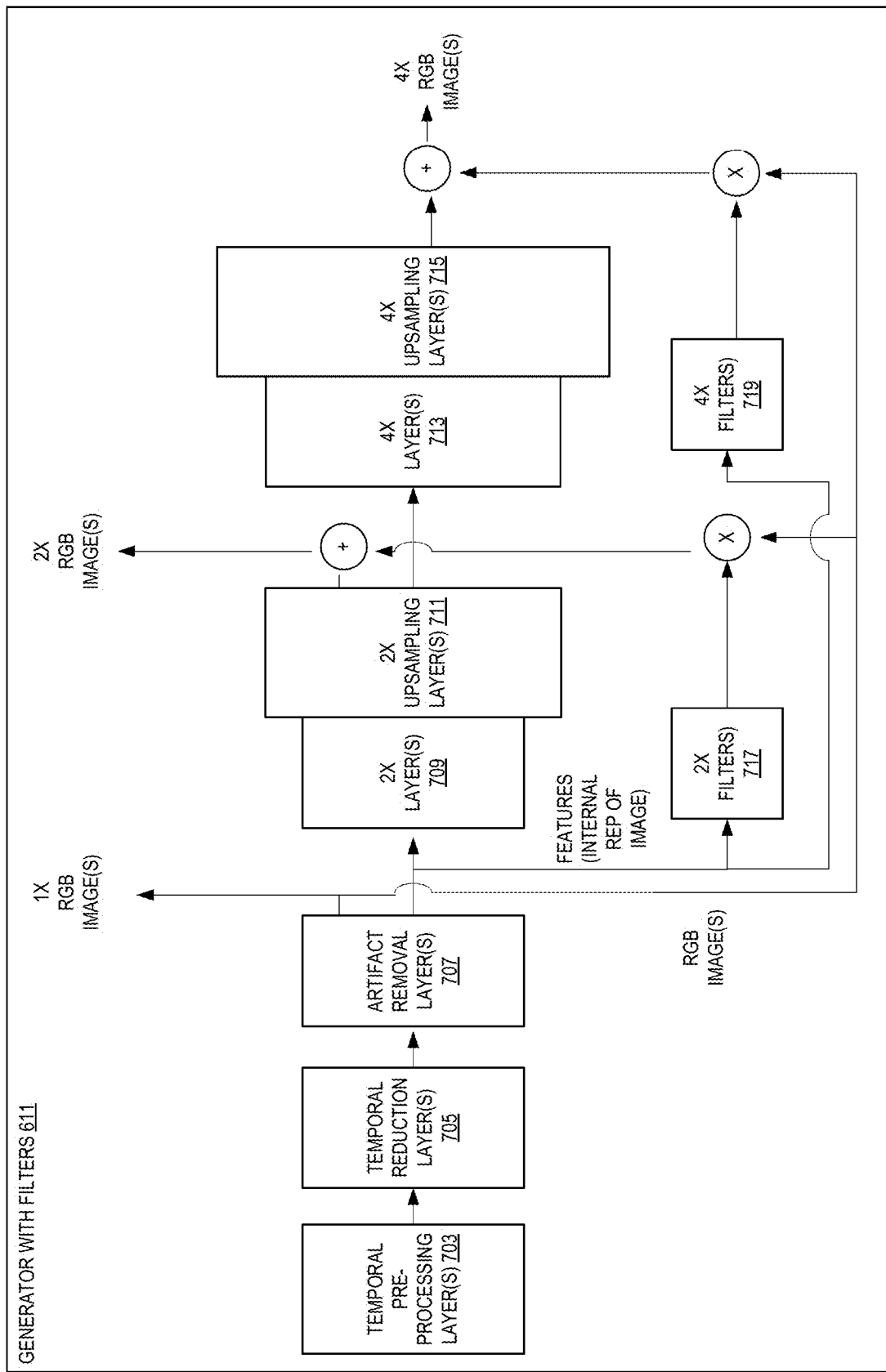
FIG. 7 illustrates embodiments of a generator with filters of a GAN of which part may be used to generate enhanced images during training of the GAN.

FIG. 7 illustrates embodiments of a generator with filters of a GAN of which part may be used to generate enhanced images during training of the GAN. As noted above, in some embodiments the discriminator 613 and generator with filters 611 are trained progressively. In progressive training, both the generator with filters 611 and discriminator 613 start off at lower resolution and new layers that produce increasingly higher resolutions are added during training. When a new set of layers are added, they are slowly blended in over several epochs and then stabilized for several more epochs.

The generator with filters 611 and discriminator 613 comprise multiple stages each and this illustration is for embodiments of the generator with filters 611.

In some embodiments, the generator with filters 611 performs some temporal pre-processing (such as concatenating lower resolution images along the temporal dimension) using a temporal pre-processing layer(s) 703. The temporal dimension is then reduced from 2 n+1 to 1 using a temporal reduction layer(s) 705 which, in some embodiments, consists of a set of 3×3×3 3D convolutions with no padding in the temporal dimension.

In this particular example (having a 4× upscaling), the generator with filters 611 are trained in multiple stages. In a first stage, the generator with filters 611 is trained to only remove compression artifacts and output an image that has the same resolution (1×) as the input images and features using artifact removal layer(s) 707. In this stage, the generator with filters 611 are initialized using only mean squared error (MSE) and perceptual losses. Note that because the generator with filters 611 are trained to output an image at the 1× stage by enforcing perceptual and MSE losses throughout all training stages, the 1× value can be used to verify the model's ability to remove encoding artifacts at this stage.

A second stage (comprising 2× layer(s) 709, upsampling layer(s) 711, and 2× filters 717) processes the features of the 1× image (using the 2× layer(s) 709) to generate a higher resolution image (using the 2× layer(s) 709) and upsample features of the higher resolution image using the upsampling layer(s) 711. Note the discriminator 613 may also be enabled. In some embodiments, the 2× layer(s) 709 is/are one or more CNN layers. The adversarial loss is used in addition to MSE and perceptual losses for training the generator with filters 611. In some embodiments, the 2× filter(s) 717 are generated from the output features of the artifact removal layer(s) 707. This allows the generator with filters 611 to learn to upsample the image after artifacts were removed. Note that for efficiency, in some embodiments, most of the computation is performed in 1× resolution and only at the end a depth-to-space layer for 2× upsampling is performed using 2× upsampling layer(s) 711. The 2× layer(s) 709 for both the generator with filters 611 and the discriminator 613 are blended over several epochs and then stabilized for several more epochs. The product of the output of the 2× filters 717 and the 1× RGB image is added to the output of the 2× upsampling layer(s) 711 to produce the 2× RGB image(s) which the discriminator 613 consumes.

A third stage is used for blending and stabilizing the 4× output in an analogous way to the second stage using 4× filters 719, 4× layer(s) 713 on the output of the 2× upsampling layer(s) 711, and 4× upsampling layer(s) 715. After the 4× layers have been blended in completely, the losses on the 2× output are no longer enforced. 4× RGB images are produced using a product of the output of the 4× filter(s) 719 with the 1× RGB image(s) produced by the artifact removal layer(s) 707 that has been summed with the output of the 4× upsampling layer(s) 715.

Figure 8:
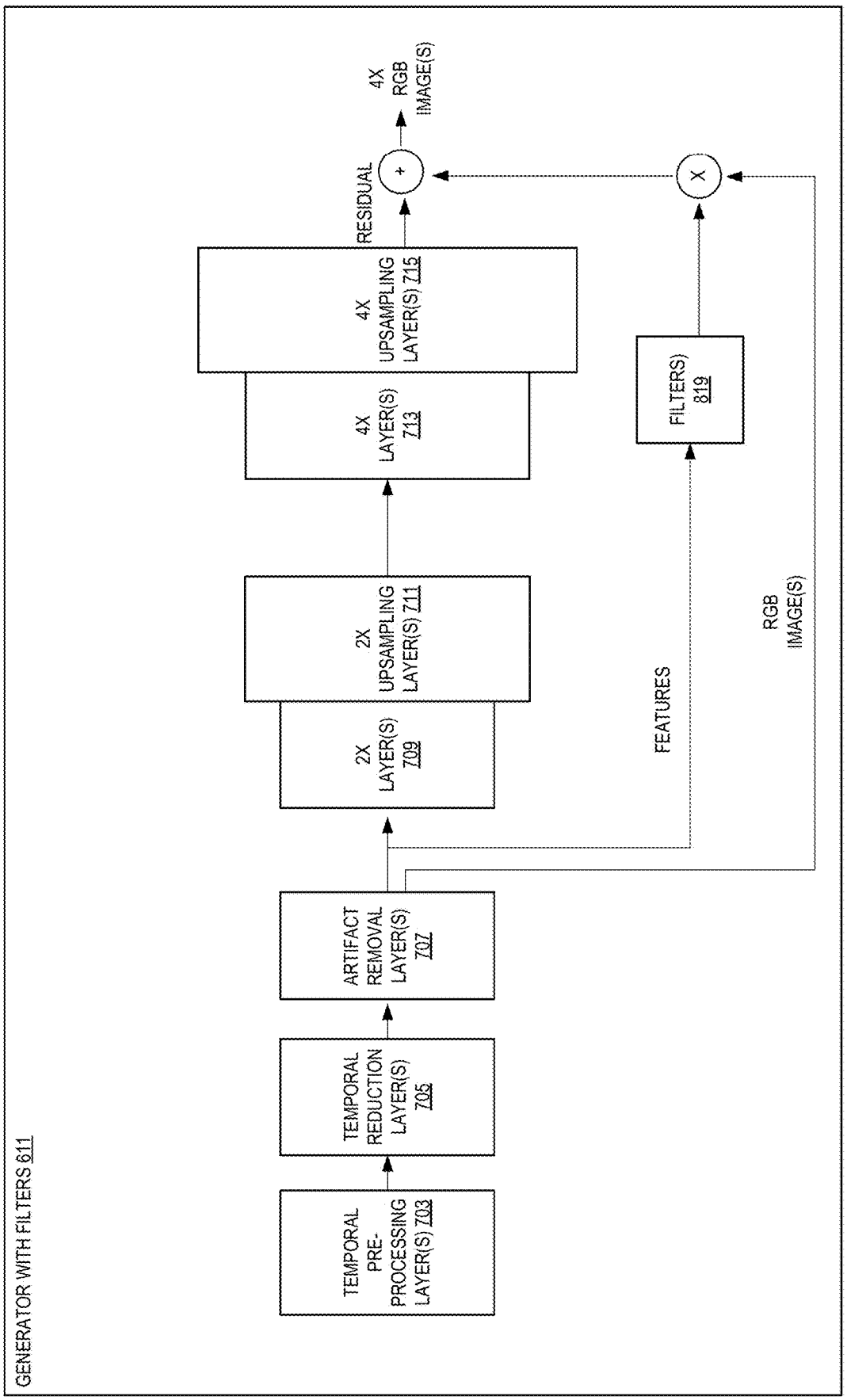
FIG. 8 illustrates embodiments of a generator with filters of progressively trained GAN.

FIG. 8 illustrates embodiments of a generator with filters 611 of progressively trained GAN. As shown, the filtering procedure using filter(s) 819 is simplified from training in that the filter(s) 819 only act on the output of the artifact removal layer(s) 707.

Figure 9:
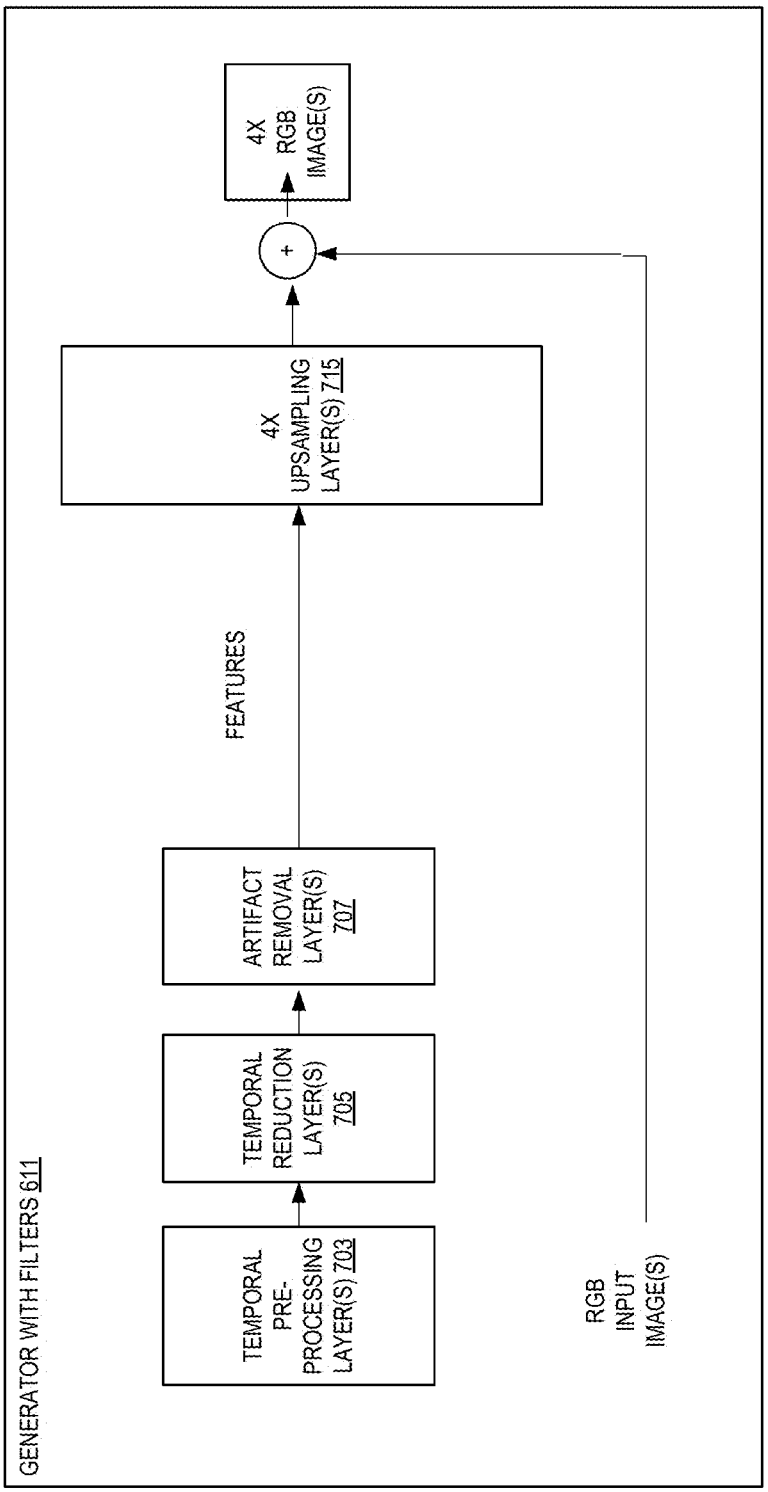
FIG. 9 illustrates embodiments of a generator with filters of progressively trained GAN.

FIG. 9 illustrates embodiments of a generator with filters 611 of progressively trained GAN. This is a more simplified version of the generator with filters 611 of FIG. 8 where the 2× layer(s) 709, 2× upsampling layer(s) 711, and 4× layer(s) 713 are not utilized.

Figure 10:
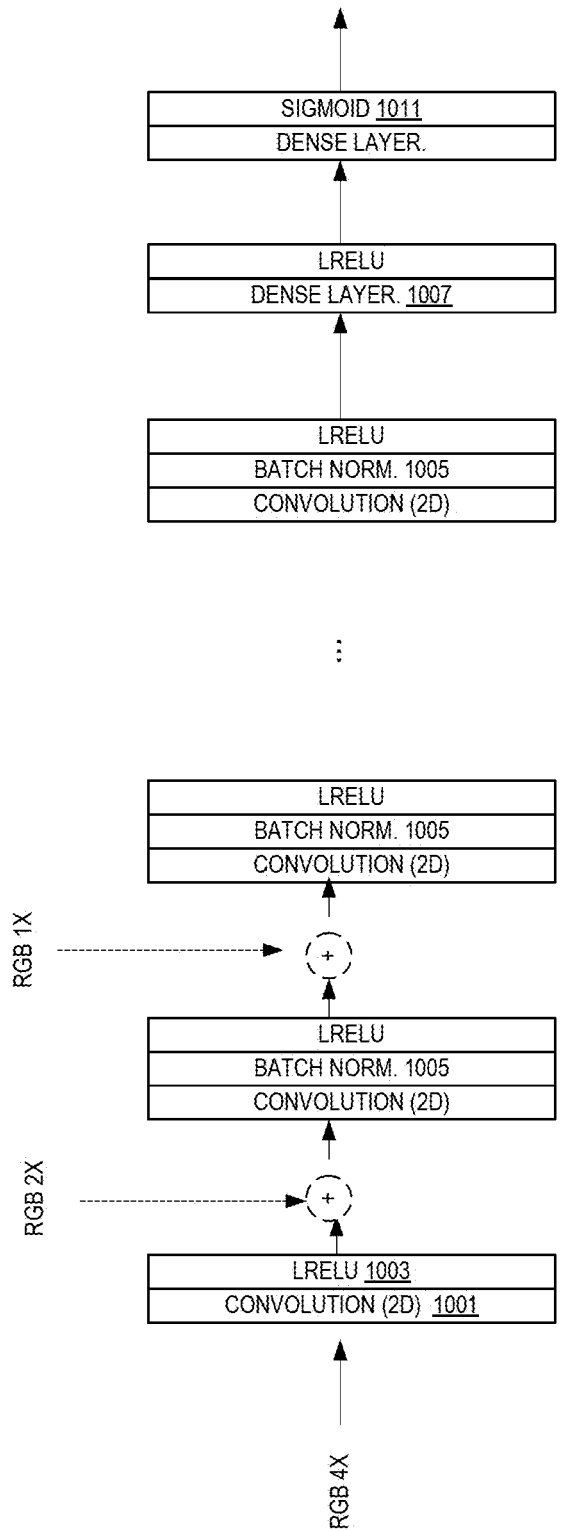
FIG. 10 illustrates embodiments of a discriminator of a GAN.

FIG. 10 illustrates embodiments of a discriminator of a GAN. This GAN takes in the RGB values from the generator with filters 711. The RGB 4× values are subjected to a 2D convolution 1001 using 64 channels followed by a leaky ReLU (LReLU) 1003. The output of the LReLU is added to the RGB 2× values and then subjected to a 2D convolution using 128 channels followed by batch normalization 1005 and another LReLU.

The output of the second LReLU is added to the RGB 1× values and then subjected to a plurality of convolution-BN-LReLU combinations using 2D convolutions from 256 to 2048 to 256 channels.

One or more dense layers are used to flatten the result and then a sigmoid activation function 1011 is applied.

Figure 11:
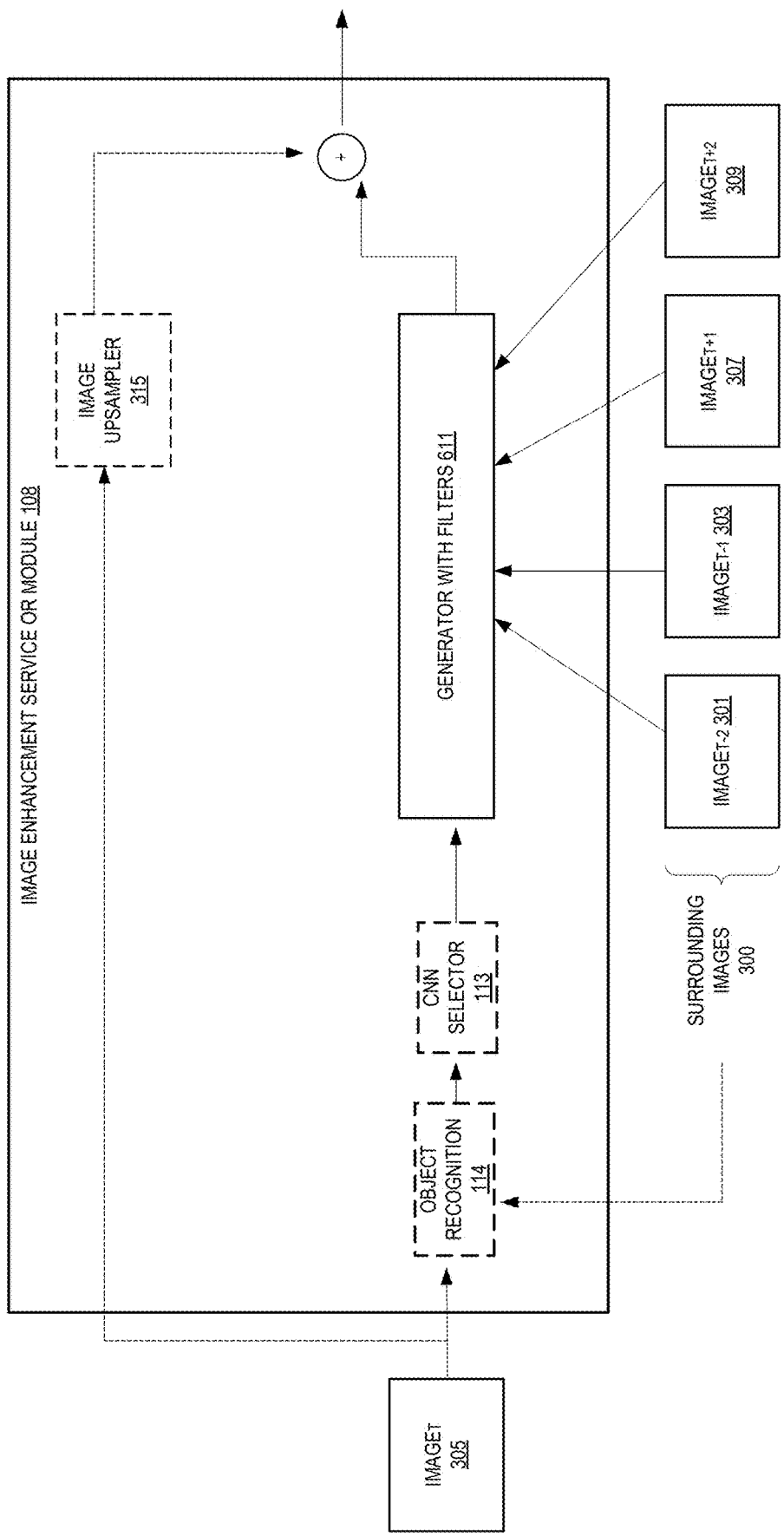
FIG. 11 illustrates embodiments of an image enhancement service or module to be used in inference where the CNN to produce a higher resolution image is the generator of a GAN.

FIG. 11 illustrates embodiments of an image enhancement service or module to be used in inference where the CNN to produce a higher resolution image is the generator of a GAN. The image enhancement service or module 108 is to be utilized to enhance one or more images, or proper subsets of images thereof, of a video in response to an inference request to do so as noted previously. Again, note what is not shown in this illustration is any feature detection means which may be utilized to set what aspects of an image are to be enhanced (such as a visage). In this illustration, the image enhancement service or module 108 includes a convolutional neural network (CNN) that is the generator with filters 611 of a GAN. A lower resolution image 305 and/or one or more surrounding images 300 is/are passed to the generator with filters 611 which produces the higher resolution image.

Figure 12:
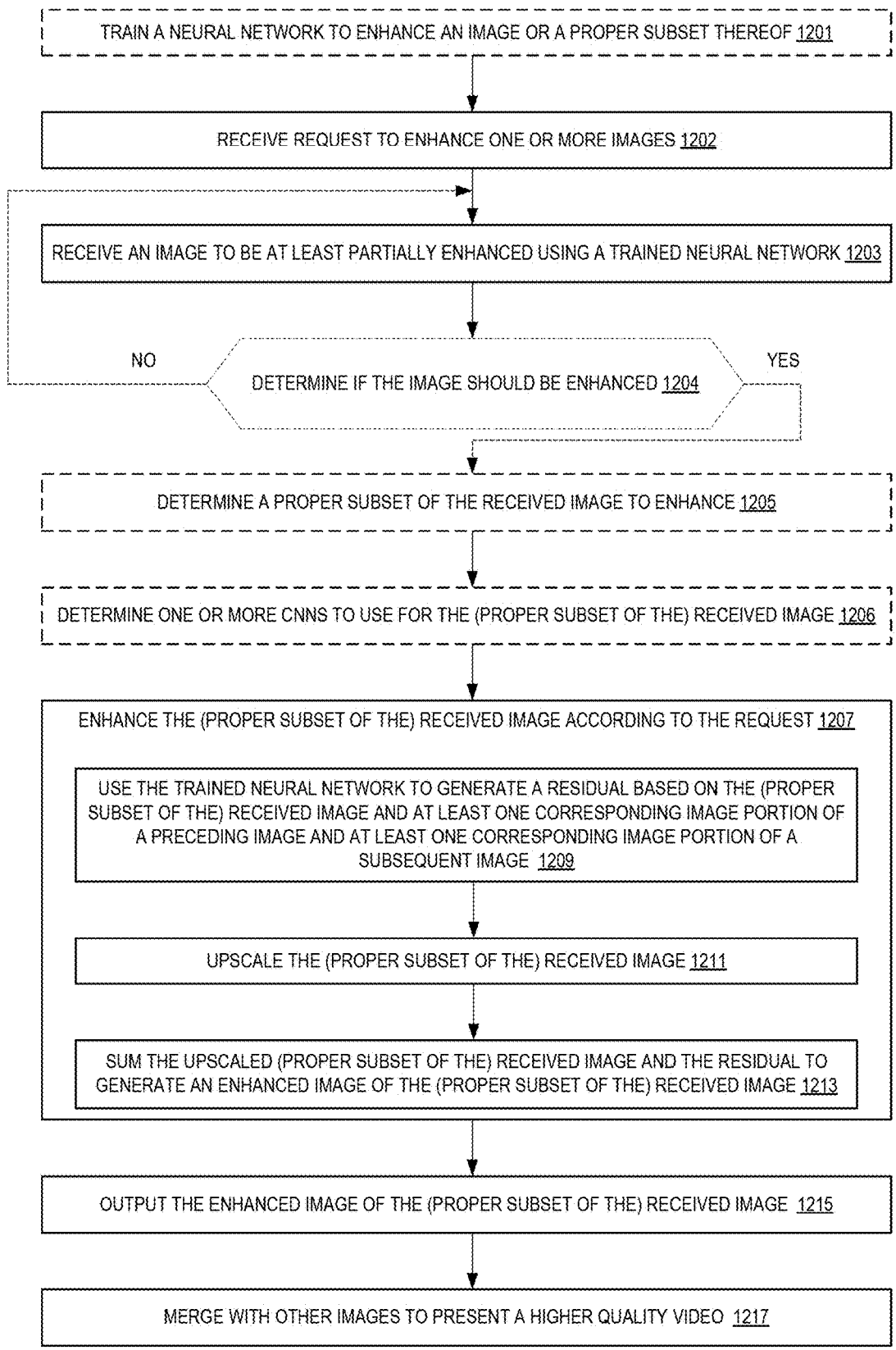
FIG. 12 is a flow diagram illustrating embodiments of a method for enhancing an image.

FIG. 12 is a flow diagram illustrating embodiments of a method for enhancing an image. Depending upon the implementation, this method may be performed as a part of a service of a provider network, on a client device (sender and/or receiver), and/or a combination thereof.

In some embodiments, at 1201, a neural network to enhance an image, or a proper subset thereof, is trained. For example, a generator or generator with filters of a GAN or one or more CNN layers are trained as discussed herein. Note that a neural network may be trained for different environments. For example, a different neural network may be used depending upon the bandwidth available to the neural network (which may impact the initial resolution), processing power available, power available (e.g., it may not be best to render very high-resolution images on a mobile device), an acceptable latency, etc.

At 1202, a request to enhance one or more images is received. This request may include at least one of a location of the neural network to use, a location of an image-based file (such as solo image file, a video file, etc.), a desired resolution, which images to enhance (for example, not enhance higher quality frames), etc. Additionally, a stored neural network may have different profiles to utilize depending upon environmental factors such as processing power, power, etc. The request may come from a client device user, an application, etc.

An image to be at least partially enhanced using a trained neural network is received at 1203. For example, a lower resolution image that is a part of a video stream or file is received by an image enhancement service or module which have been detailed above.

In some embodiments, a determination of if the received image should be enhanced is made at 1204. In some embodiments, as some images arrive with better quality than others, the higher quality frames may be found by an image quality assessment or by appending a known pattern to every frame from where to judge the distortion. Depending upon the processing capabilities, available bandwidth, etc. the different types of images may be handled differently. For example, higher quality images may not be enhanced by either a sender or a receiver. Assessing image quality per image to potentially enhance may also be used purposefully to reduce bandwidth not enhancing some frames with already higher quality and using those higher quality frames to help get a better overall output at a reduced average bitrate. If not, then the next image to potentially enhanced is received at 1203.

If so, then in some embodiments, a determination of a proper subset of the received image to enhance is made at 1205. For example, an object recognition of a visage, etc. is made. Streamed and compressed images contain some regions that are more informative than others or more relevant such as people, edges of objects, center of the image, etc. Operating on fixing the entire image may be too expensive computationally or unnecessary. Note that in some embodiments, a sender using this method may reduce bandwidth by sending the most relevant parts of the image with less compression than the remainder of the image. In some embodiments, when this method is performed by a sender, the encodes information with the image itself that notes the image, or a proper subset thereof, is important so that the receiving end only applies the removal of artifacts on pre-defined areas making the process faster and also requiring less bandwidth overall. In those embodiments, the receiver can then determine what to enhance in an image.

In some embodiments, a determination of one or more CNNs to use for enhancement is made at 1206. Examples of what goes into that determination have been detailed.

The (proper subset of the) received image is enhanced according to the request at 1207. The trained neural network generates a residual value based on the (proper subset of the) received image and at least one corresponding image portion of a preceding lower resolution image and at least one corresponding image portion of a subsequent lower resolution image at 1209. The (proper subset of the) received image is upscaled at 1211. The upscaled (proper subset of the) received image and residual value are added to generate an enhanced image of the (proper subset of the) received image at 1213. Note that multiple CNNs may be used on a single image. For example, a proper subset of an image may use one CNN and the rest of the image may use a different CNN, etc.

The enhanced image is output at 1215. For example, the enhanced image is stored, displayed, etc.

In some embodiments, the enhanced image is merged with other (potentially unenhanced) images of a video file to generate a higher quality video file at 1217. For example, a device with very low memory could store very low resolution video locally, mix this local data with enhanced streamed low bitrate video to create a better quality output.

Figure 13:
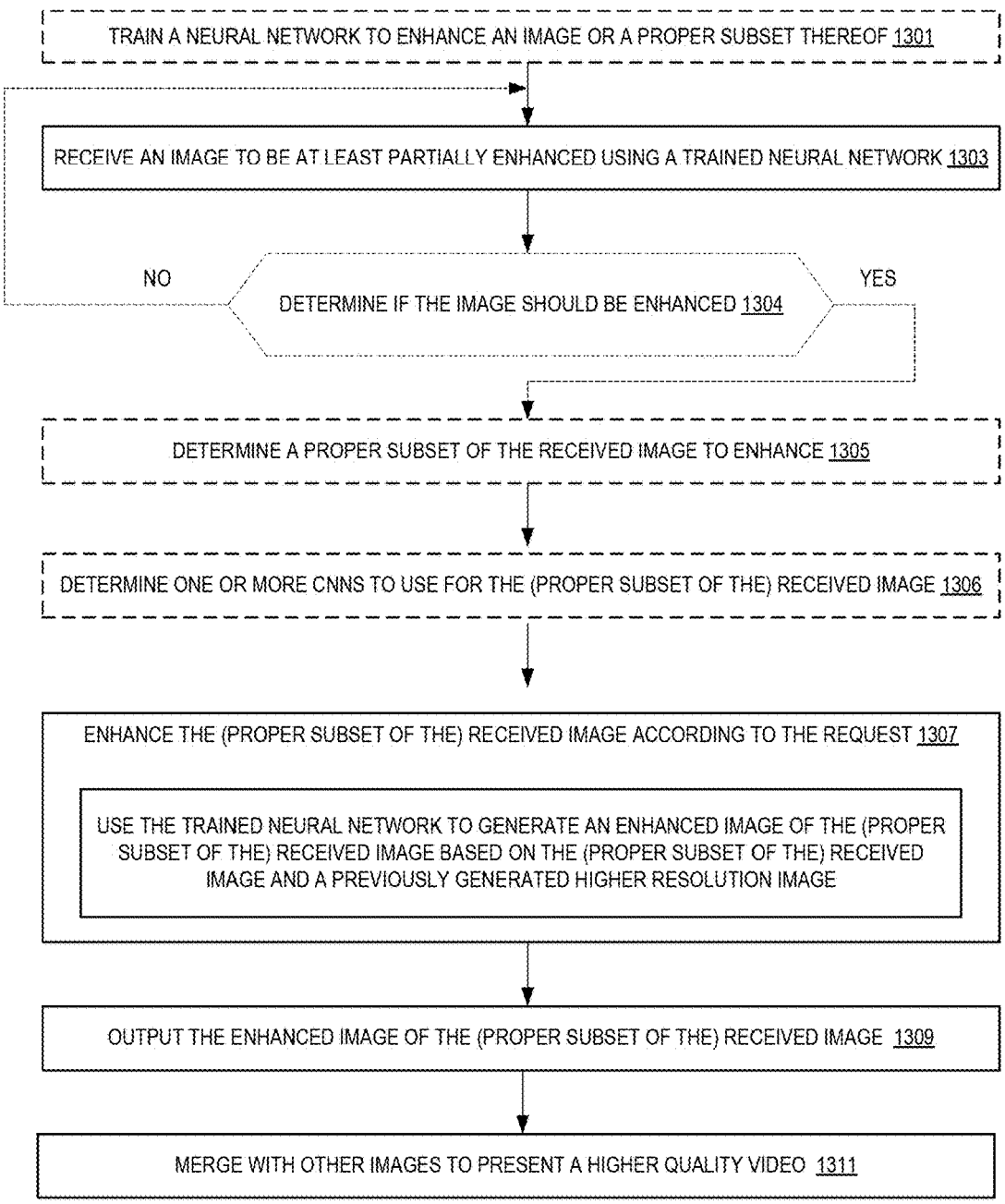
FIG. 13 a flow diagram illustrating embodiments of a method for enhancing an image.

FIG. 13 is a flow diagram illustrating embodiments of a method for enhancing an image. Depending upon the implementation, this method may be performed as a part of a service of a provider network, on a client device (sender and/or receiver), and/or a combination thereof.

In some embodiments, at 1301, a neural network to enhance an image, or a proper subset thereof, is trained. For example, a generator or generator with filters of a GAN or one or more CNN layers are trained as discussed herein. Note that a neural network may be trained for different environments. For example, a different neural network may be used depending upon the bandwidth available to the neural network (which may impact the initial resolution), processing power available, power available (e.g., it may not be best to render very high-resolution images on a mobile device), an acceptable latency, etc.

At 1302, a request to enhance one or more images is received. This request may include at least one of a location of the neural network to use, a location of an image-based file (such as solo image file, a video file, etc.), a desired resolution, which images to enhance (for example, not enhance higher quality frames), etc. Additionally, a stored neural network may have different profiles to utilize depending upon environmental factors such as processing power, power, etc. The request may come from a client device user, an application, etc.

An image to be at least partially enhanced using a trained neural network is received at 1303. For example, a lower resolution image that is a part of a video stream or file is received by an image enhancement service or module which have been detailed above.

In some embodiments, a determination of if the received image should be enhanced is made at 1304. In some embodiments, as some images arrive with better quality than others, the higher quality frames may be found by an image quality assessment or by appending a known pattern to every frame from where to judge the distortion. Depending upon the processing capabilities, available bandwidth, etc. the different types of images may be handled differently. For example, higher quality images may not be enhanced by either a sender or a receiver. Assessing image quality per image to potentially enhance may also be used purposefully to reduce bandwidth not enhancing some frames with already higher quality and using those higher quality frames to help get a better overall output at a reduced average bitrate. If not, then the next image to potentially enhanced is received at 1303.

If so, then in some embodiments, a determination of a proper subset of the received image to enhance is made at 1305. For example, an object recognition of a visage, etc. is made. Streamed and compressed images contain some regions that are more informative than others or more relevant such as people, edges of objects, center of the image, etc. Operating on fixing the entire image may be too expensive computationally or unnecessary. Note that in some embodiments, a sender using this method may reduce bandwidth by sending the most relevant parts of the image with less compression than the remainder of the image. In some embodiments, when this method is performed by a sender, the encodes information with the image itself that notes the image, or a proper subset thereof, is important so that the receiving end only applies the removal of artifacts on pre-defined areas making the process faster and also requiring less bandwidth overall. In those embodiments, the receiver can then determine what to enhance in an image.

In some embodiments, a determination of a CNN to use for enhancement is made at 1306. Examples of what goes into that determination have been detailed.

The (proper subset of the) received image is enhanced at 1307 using the trained neural network to generate an enhanced image of the (proper subset of the) received image based on the (proper subset of the) received image and a previously generated higher resolution image. In some embodiments, the previously generated higher resolution image was generated according to 807. In other embodiments, the previously generated higher resolution image was simply made by using the trained neural network without having a second input. Note that multiple CNNs may be used on a single image. For example, a proper subset of an image may use one CNN and the rest of the image may use a different CNN, etc.

The enhanced image is output at 1309. For example, the enhanced image is stored, displayed, etc.

In some embodiments, the enhanced image is merged with other (potentially unenhanced) images of a video file to generate a higher quality video file at 1311. For example, a device with very low memory could store very low resolution video locally, mix this local data with enhanced streamed low bitrate video to create a better quality output.

Figure 14:
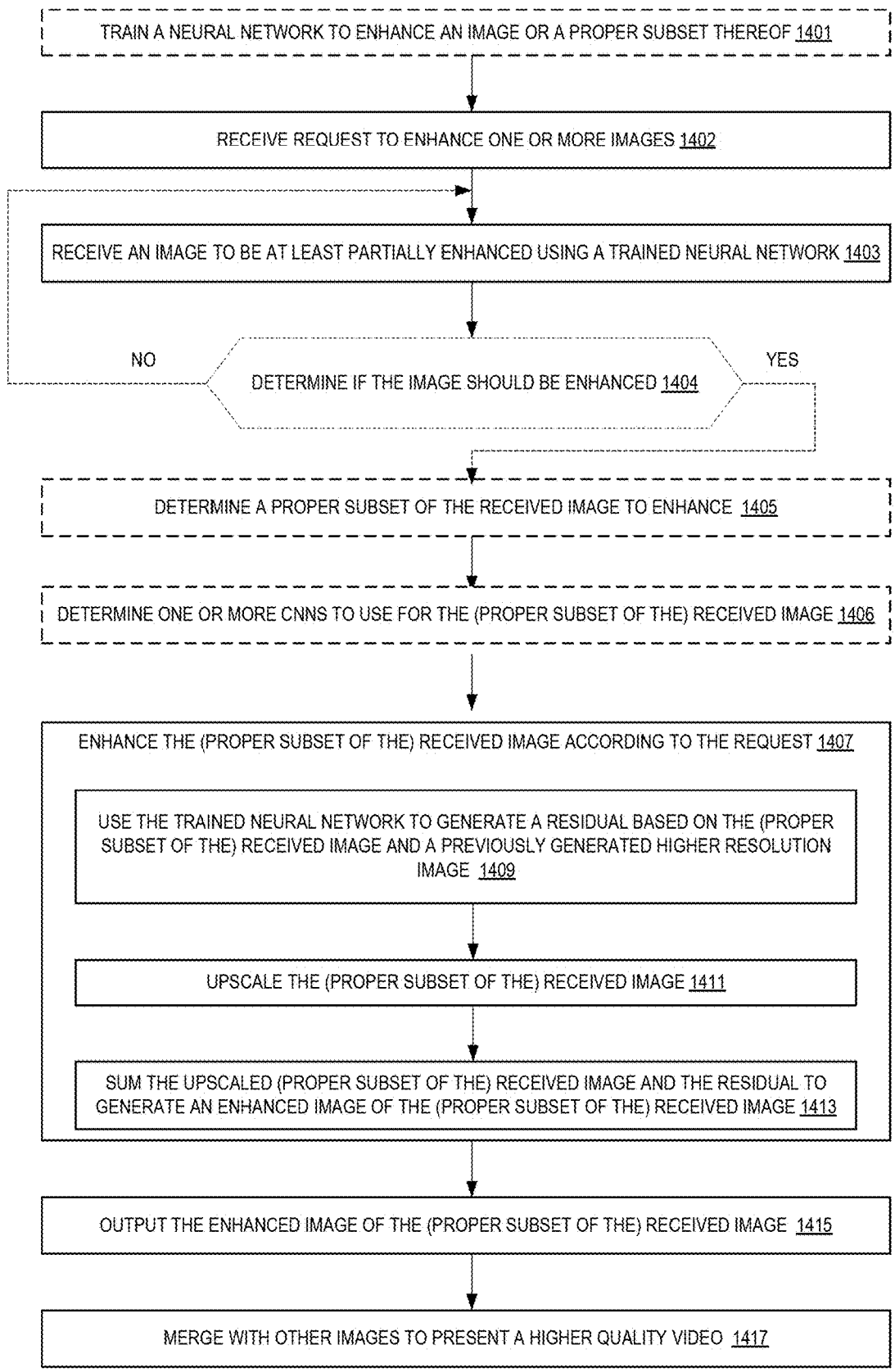
FIG. 14 is a flow diagram illustrating embodiments of a method for enhancing an image.

FIG. 14 is a flow diagram illustrating embodiments of a method for enhancing an image. Depending upon the implementation, this method may be performed as a part of a service of a provider network, on a client device (sender and/or receiver), and/or a combination thereof.

In some embodiments, at 1401, a neural network to enhance an image, or a proper subset thereof, is trained. For example, a generator or generator with filters of a GAN or one or more CNN layers are trained as discussed herein. Note that a neural network may be trained for different environments. For example, a different neural network may be used depending upon the bandwidth available to the neural network (which may impact the initial resolution), processing power available, power available (e.g., it may not be best to render very high-resolution images on a mobile device), an acceptable latency, locality (for example, for a particular geography/look a network can be trained that works well with images from a particular location, lighting (day, night, inside, etc.), screen resolution, etc.

At 1402, a request to enhance one or more images is received. This request may include at least one of a location of the neural network to use, a location of an image-based file (such as solo image file, a video file, etc.), a desired resolution, etc. Additionally, a stored neural network may have different profiles to utilize depending upon environmental factors such as processing power, power, etc. The request may come from a client device user, an application, etc.

An image to be at least partially enhanced using a trained neural network is received at 1403. For example, a lower resolution image that is a part of a video stream or file is received by an image enhancement service or module which have been detailed above.

In some embodiments, a determination of if the received image should be enhanced is made at 1404. In some embodiments, as some images arrive with better quality than others, the higher quality frames may be found by an image quality assessment or by appending a known pattern to every frame from where to judge the distortion. Depending upon the processing capabilities, available bandwidth, etc. the different types of images may be handled differently. For example, higher quality images may not be enhanced by either a sender or a receiver. Assessing image quality per image to potentially enhance may also be used purposefully to reduce bandwidth not enhancing some frames with already higher quality and using those higher quality frames to help get a better overall output at a reduced average bitrate. If not, then the next image to potentially enhanced is received at 1403.

If so, then in some embodiments, a determination of a proper subset of the received image to enhance is made at 1405. For example, an object recognition of a visage, etc. is made. Streamed and compressed images contain some regions that are more informative than others or more relevant such as people, edges of objects, center of the image, etc. Operating on fixing the entire image may be too expensive computationally or unnecessary. Note that in some embodiments, a sender using this method may reduce bandwidth by sending the most relevant parts of the image with less compression than the remainder of the image. In some embodiments, when this method is performed by a sender, the encodes information with the image itself that notes the image, or a proper subset thereof, is important so that the receiving end only applies the removal of artifacts on pre-defined areas making the process faster and also requiring less bandwidth overall. In those embodiments, the receiver can then determine what to enhance in an image.

The (proper subset of the) received image is enhanced according to the request at 1407. The trained neural network generates a residual value based on the (proper subset of the) received image and a previously generated higher resolution image. The (proper subset of the) received image is upscaled at 1411. The upscaled (proper subset of the) received image and residual value are added to generate an enhanced image of the (proper subset of the) received image at 1413. Note that multiple CNNs may be used on a single image. For example, a proper subset of an image may use one CNN and the rest of the image may use a different CNN, etc.

The enhanced image is output at 1415. For example, the enhanced image is stored, displayed, etc.

In some embodiments, the enhanced image is merged with other (potentially unenhanced) images of a video file to generate a higher quality video file at 1417. For example, a device with very low memory could store very low resolution video locally, mix this local data with enhanced streamed low bitrate video to create a better quality output.

Figure 15:
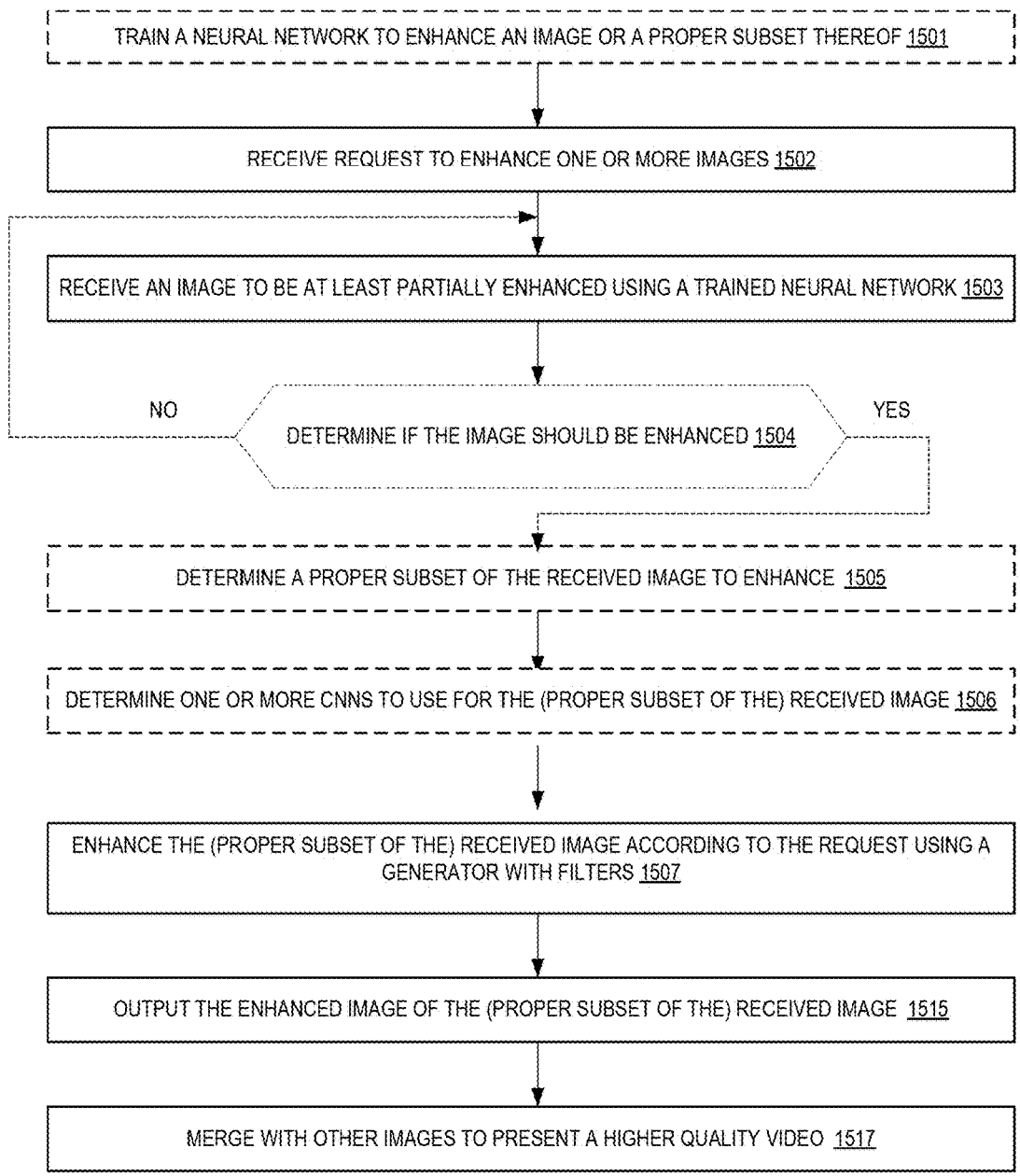
FIG. 15 is a flow diagram illustrating embodiments of a method for enhancing an image.

FIG. 15 is a flow diagram illustrating embodiments of a method for enhancing an image. Depending upon the implementation, this method may be performed as a part of a service of a provider network, on a client device (sender and/or receiver), and/or a combination thereof.

In some embodiments, at 1501, a neural network to enhance an image, or a proper subset thereof, is trained. For example, a generator or generator with filters of a GAN or one or more CNN layers are trained as discussed herein. Note that a neural network may be trained for different environments. For example, a different neural network may be used depending upon the bandwidth available to the neural network (which may impact the initial resolution), processing power available, power available (e.g., it may not be best to render very high-resolution images on a mobile device), an acceptable latency, locality (for example, for a particular geography/look a network can be trained that works well with images from a particular location, lighting (day, night, inside, etc.), screen resolution, etc.

At 1502, a request to enhance one or more images is received. This request may include at least one of a location of the neural network to use, a location of an image-based file (such as solo image file, a video file, etc.), a desired resolution, etc. Additionally, a stored neural network may have different profiles to utilize depending upon environmental factors such as processing power, power, etc. The request may come from a client device user, an application, etc.

An image to be at least partially enhanced using a trained neural network is received at 1503. For example, a lower resolution image that is a part of a video stream or file is received by an image enhancement service or module which have been detailed above.

In some embodiments, a determination of if the received image should be enhanced is made at 1504. In some embodiments, as some images arrive with better quality than others, the higher quality frames may be found by an image quality assessment or by appending a known pattern to every frame from where to judge the distortion. Depending upon the processing capabilities, available bandwidth, etc. the different types of images may be handled differently. For example, higher quality images may not be enhanced by either a sender or a receiver. Assessing image quality per image to potentially enhance may also be used purposefully to reduce bandwidth not enhancing some frames with already higher quality and using those higher quality frames to help get a better overall output at a reduced average bitrate. If not, then the next image to potentially enhanced is received at 1503.

If so, then in some embodiments, a determination of a proper subset of the received image to enhance is made at 1505. For example, an object recognition of a visage, etc. is made. Streamed and compressed images contain some regions that are more informative than others or more relevant such as people, edges of objects, center of the image, etc. Operating on fixing the entire image may be too expensive computationally or unnecessary. Note that in some embodiments, a sender using this method may reduce bandwidth by sending the most relevant parts of the image with less compression than the remainder of the image. In some embodiments, when this method is performed by a sender, the encodes information with the image itself that notes the image, or a proper subset thereof, is important so that the receiving end only applies the removal of artifacts on pre-defined areas making the process faster and also requiring less bandwidth overall. In those embodiments, the receiver can then determine what to enhance in an image.

The (proper subset of the) received image is enhanced using a generator with filters according to the request at 1507 as follows. The lower-resolution image and one or more neighboring images are pre-processed by concatenating the lower-resolution images along a temporal dimension. This is followed, in some embodiments, with a temporal reduction of the concatenated images. Artifacts are the (temporally reduced) concatenated images are removed at a first resolution to generate a first red, green, blue (RGB) image using an artifact removal layer and features of the first RGB image.

In some embodiments, features of the first RGB image are processed at a second, higher resolution to generate a second RGB image and features of that second, higher resolution image are upsampled. The features of the second RGB image are then processed at a third, higher resolution to generate a third RGB image and the features of the third RGB image are upsampled to generate a residual of the third RGB image. In some embodiments, a filter from the features of the first RGB image is generated and a product of the generated filter and the RGB image generated by the artifact removal layer is performed. A sum of the product with the residual of the third RGB image generates an enhanced image.

In some embodiments, features output from the artifact removal layer are upsampled to generate a residual. A sum of the residual with an input RGB image generates an enhanced image.

The enhanced image is output at 1515. For example, the enhanced image is stored, displayed, etc.

In some embodiments, the enhanced image is merged with other (potentially unenhanced) images of a video file to generate a higher quality video file at 1517. For example, a device with very low memory could store very low resolution video locally, mix this local data with enhanced streamed low bitrate video to create a better quality output.

Typically, the design of CNNs (such as those detailed above) is mostly hand-crafted. This can be inefficient. Detailed here are embodiments of a method to help automatically generate and quickly assess potential networks via an optimization algorithm. In particular, elements such as number of layers, filter sizes, time windows, and others are (hyper)parameterized. For a given proposed network, parameters are encoded with a gradient that lead to them. That is for those CNNs that are more desirable it is possible to know which direction (parameter) helped them.

Within streaming video enhancement, there are generally two main criteria: image quality and speed of processing per frame. Image quality is difficult to measure quantitatively and most commonly done via metrics such as peak signal to noise ratio (PSNR). This and other similar metrics are only roughly indicative of true perceptual quality but enough to guide the optimization algorithm.

Figure 16:
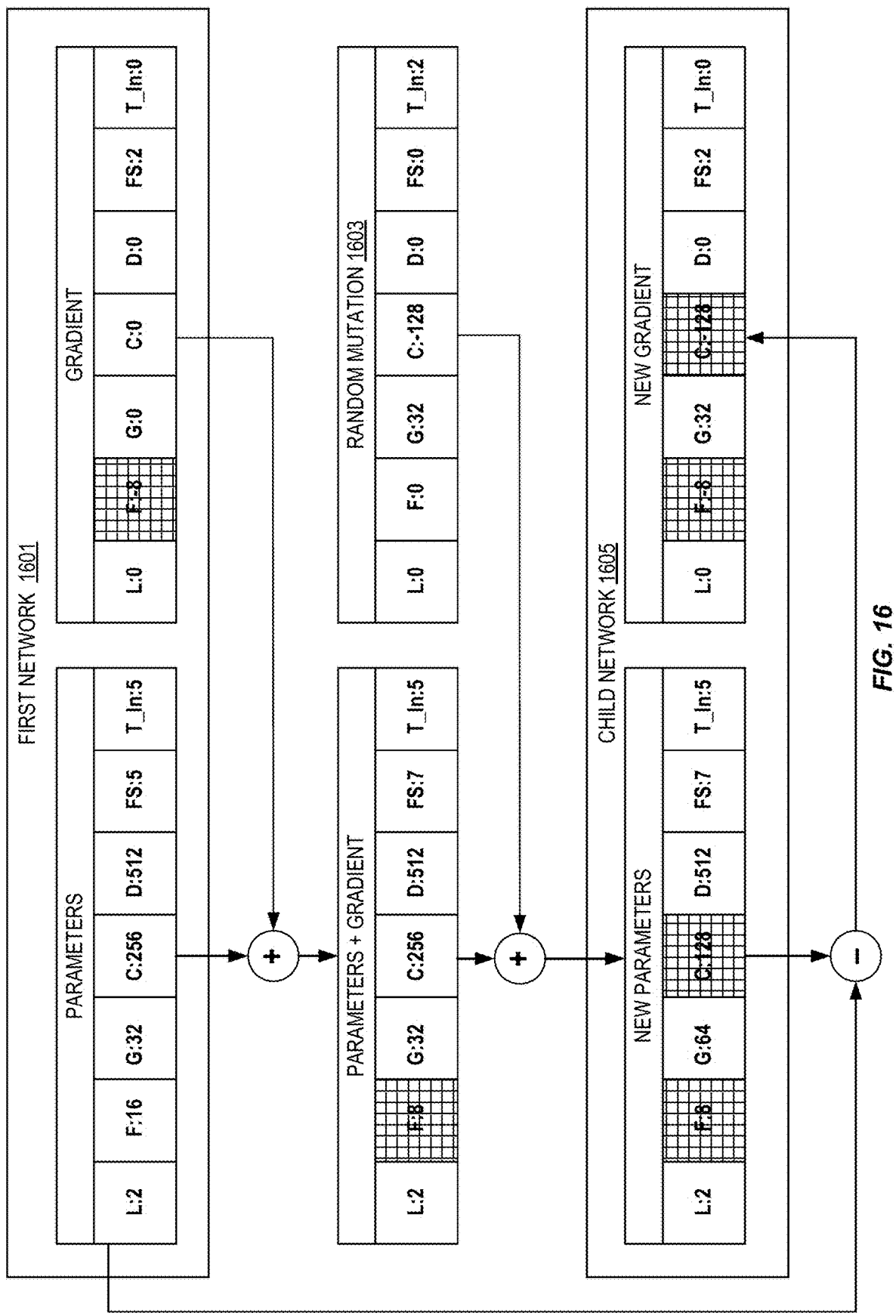
FIG. 16 illustrates an example of a Pareto front.

To keep track of the best overall CNNs in this dual criteria space, a Pareto front is used. FIG. 16 illustrates an example of a created samples for a Pareto front The Pareto front is a graph of solutions that are better in one or more aspects over other solutions and allows for hundreds of networks to be assessed and to perform optimization on a smaller subset (the front) for further iterations and to select the current best performers from that. As shown, a first network 1601 has a plurality of parameters and a gradient with respect to a parent network. The hashed boxes represent a Pareto (optimal) value after evaluating the first network 1601. In this example, the F parameter is optimal with a value of 8.

The parameters of the first network 1601 are added to the gradient and a (random) mutation 1603 is introduced to form a child network 1605 to analyze. After the analysis, another Pareto value (this time for parameter C) has been found.

More mutations can be applied to either the first network 1601 or the child network 1605 to figure out Pareto values for each of the parameters.

Figure 17:
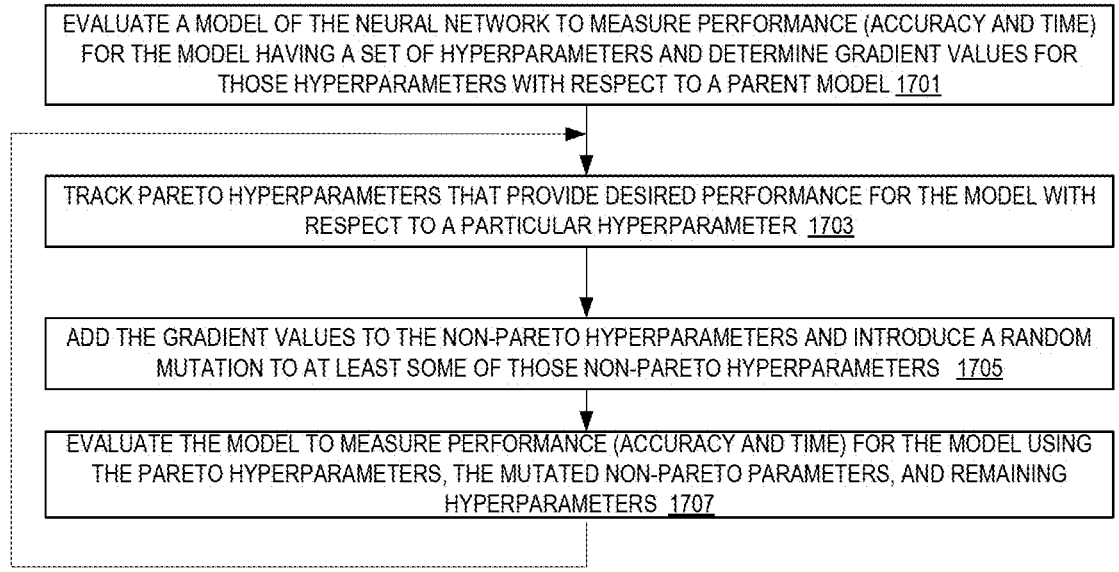
FIG. 17 is a flow diagram illustrating a method for training a neural network using a Pareto front.

FIG. 17 is a flow diagram illustrating a method for training a neural network using a Pareto front. At 1701, a model is evaluated to measure performance (accuracy and time) for the model having a set of hyperparameters and determine gradient values for those hyperparameters with respect to a parent model. In some embodiments, a plot of the model is made such as plotting peak signal-to-noise ratio (PSNR) between images and speed.

Pareto hyperparameters are tracked that provide desired performance for the model with respect to a particular hyperparameter at 1703.

The gradient values are added to the non-Pareto hyperparameters and introduce a random mutation to at least some of those non-Pareto hyperparameters at 1705.

At 1707, the model with the changes is evaluated to measure performance (accuracy and time) for the model using the Pareto hyperparameters, the mutated non-pareto parameters, and remaining hyperparameters.

The cycle of tracking Pareto hyperparameters, etc. may continue until all of the Pareto hyperparameters have been found or until the process is stopped for another reason.

Figure 18:
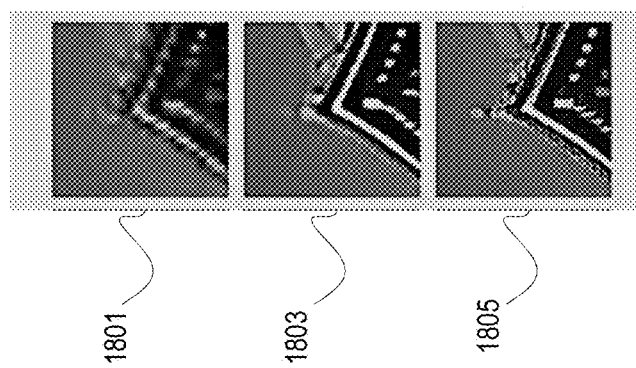
FIG. 18 illustrates some exemplary comparisons of various image renderings.

FIG. 18 illustrates some exemplary comparisons of various image renderings. Non-enhanced images 1801 show a noticeable amount of blur. CNN enhanced images 1803 show a marked improvement from that. A further improvement of using a generator from a GAN for the CNN is shown in images 1805.

Figure 19:
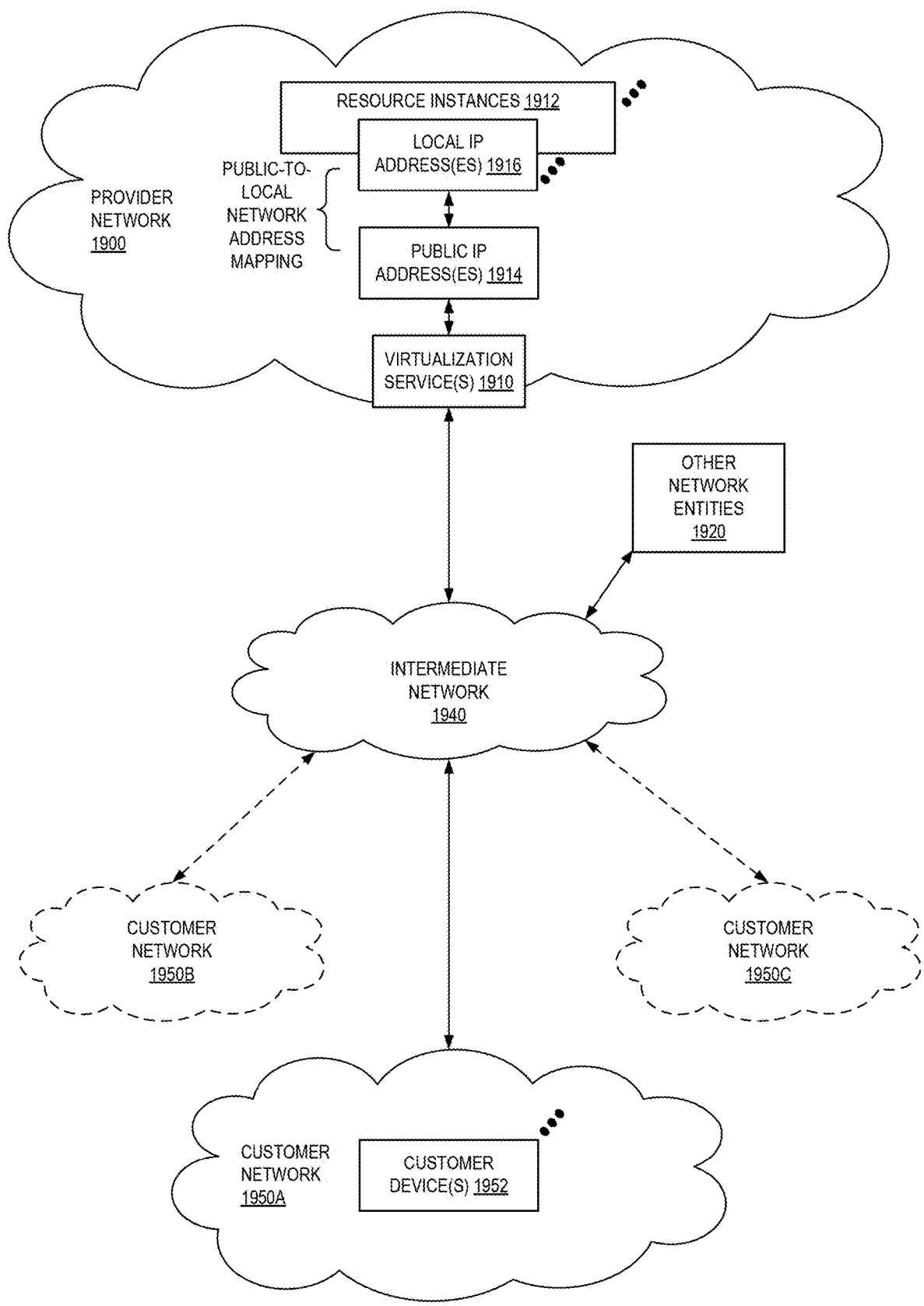
FIG. 19 illustrates an example provider network environment according to some embodiments.

FIG. 19 illustrates an example provider network (or "service provider system") environment according to some embodiments. A provider network 1900 may provide resource virtualization to customers via one or more virtualization services 1910 that allow customers to purchase, rent, or otherwise obtain instances 1912 of virtualized resources, including but not limited to computation and storage resources, implemented on devices within the provider network or networks in one or more data centers. Local Internet Protocol (IP) addresses 1916 may be associated with the resource instances 1912; the local IP addresses are the internal network addresses of the resource instances 1912 on the provider network 1900. In some embodiments, the provider network 1900 may also provide public IP addresses 1914 and/or public IP address ranges (e.g., Internet Protocol version 4 (IPv4) or Internet Protocol version 6 (IPv6) addresses) that customers may obtain from the provider 1900.

Conventionally, the provider network 1900, via the virtualization services 1910, may allow a customer of the service provider (e.g., a customer that operates one or more client networks 1950A-1950C including one or more customer device(s) 1952) to dynamically associate at least some public IP addresses 1914 assigned or allocated to the customer with particular resource instances 1912 assigned to the customer. The provider network 1900 may also allow the customer to remap a public IP address 1914, previously mapped to one virtualized computing resource instance 1912 allocated to the customer, to another virtualized computing resource instance 1912 that is also allocated to the customer. Using the virtualized computing resource instances 1912 and public IP addresses 1914 provided by the service provider, a customer of the service provider such as the operator of customer network(s) 1950A-1950C may, for example, implement customer-specific applications and present the customer's applications on an intermediate network 1940, such as the Internet. Other network entities 1920 on the intermediate network 1940 may then generate traffic to a destination public IP address 1914 published by the customer network(s) 1950A-1950C; the traffic is routed to the service provider data center, and at the data center is routed, via a network substrate, to the local IP address 1916 of the virtualized computing resource instance 1912 currently mapped to the destination public IP address 1914. Similarly, response traffic from the virtualized computing resource instance 1912 may be routed via the network substrate back onto the intermediate network 1940 to the source entity 1920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1900; a customer may then assign their allocated public IP addresses to particular resource instances allocated to the customer. These public IP addresses may be referred to as customer public IP addresses, or simply customer IP addresses. Instead of being assigned by the provider network 1900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 20:
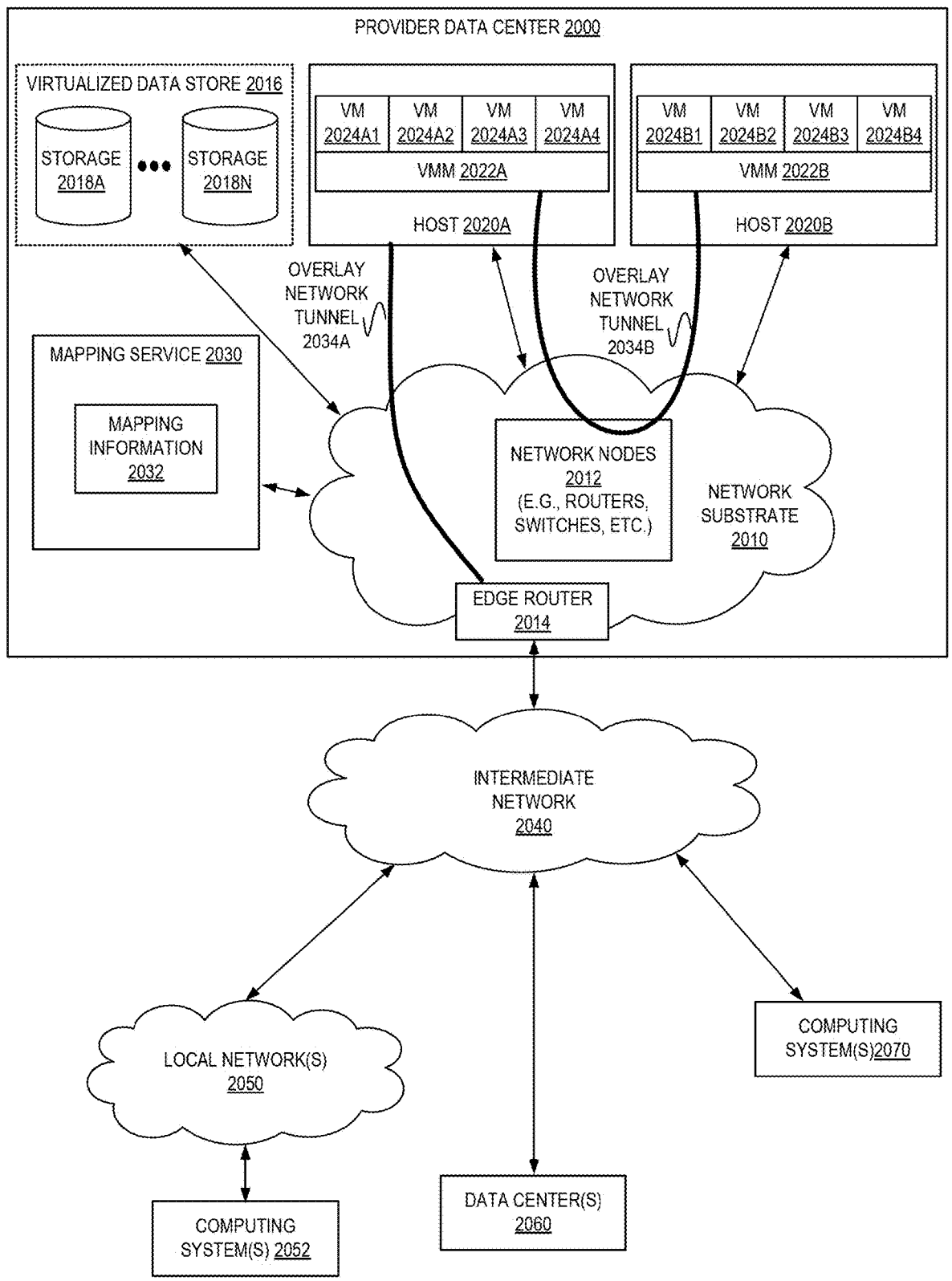
FIG. 20 illustrates an example data center that implements an overlay network on a network substrate using IP tunneling technology according to some embodiments.

FIG. 20 illustrates an example data center that implements an overlay network on a network substrate using IP tunneling technology, according to some embodiments. A provider data center 2000 may include a network substrate that includes networking nodes 2012 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 2010 using tunnels. The IP tunneling technology may provide a mapping and encapsulating system for creating an overlay network on a network (e.g., a local network in data center 2000 of FIG. 20) and may provide a separate namespace for the overlay layer (the public IP addresses) and the network substrate 2010 layer (the local IP addresses). Packets in the overlay layer may be checked against a mapping directory (e.g., provided by mapping service 2030) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 2030) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 20, an example overlay network tunnel 2034A from a virtual machine (VM) 2024A (of VMs 2024A1-2024A4, via VMM 2022A) on host 2020A to a device on the intermediate network 2050 and an example overlay network tunnel 2034B between a VM 2024A (of VMs 2024A1-2024A4, via VMM 2022A) on host 2020A and a VM 2024B (of VMs 2024B1-2024B4, via VMM 2022B) on host 2020B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 20, at least some networks in which embodiments may be implemented may include hardware virtualization technology that enables multiple operating systems to run concurrently on a host computer (e.g., hosts 2020A and 2020B of FIG. 20), i.e. as virtual machines (VMs) 2024 on the hosts 2020. The VMs 2024 may, for example, be executed in slots on the hosts 2020 that are rented or leased to customers of a network provider. A hypervisor, or virtual machine monitor (VMM) 2022, on a host 2020 presents the VMs 2024 on the host with a virtual platform and monitors the execution of the VMs 2024. Each VM 2024 may be provided with one or more local IP addresses; the VMM 2022 on a host 2020 may be aware of the local IP addresses of the VMs 2024 on the host. A mapping service 2030 may be aware of (e.g., via stored mapping information 2032) network IP prefixes and IP addresses of routers or other devices serving IP addresses on the local network. This includes the IP addresses of the VMMs 2022 serving multiple VMs 2024. The mapping service 2030 may be centralized, for example on a server system, or alternatively may be distributed among two or more server systems or other devices on the network. A network may, for example, use the mapping service technology and IP tunneling technology to, for example, route data packets between VMs 2024 on different hosts 2020 within the data center 2000 network; note that an interior gateway protocol (IGP) may be used to exchange routing information within such a local network.

In addition, a network such as the provider data center 2000 network (which is sometimes referred to as an autonomous system (AS)) may use the mapping service technology, IP tunneling technology, and routing service technology to route packets from the VMs 2024 to Internet destinations, and from Internet sources to the VMs 2024. Note that an external gateway protocol (EGP) or border gateway protocol (BGP) is typically used for Internet routing between sources and destinations on the Internet. FIG. 20 shows an example provider data center 2000 implementing a network that provides resource virtualization technology and that provides full Internet access via edge router(s) 2014 that connect to Internet transit providers, according to some embodiments. The provider data center 2000 may, for example, provide customers the ability to implement virtual computing systems (VMs 2024) via a hardware virtualization service and the ability to implement virtualized data stores 2016 on storage resources 2018A-2018N via a storage service.

The data center 2000 network may implement IP tunneling technology, mapping service technology, and a routing service technology to route traffic to and from virtualized resources, for example to route packets from the VMs 2024 on hosts 2020 in data center 2000 to Internet destinations, and from Internet sources to the VMs 2024. Internet sources and destinations may, for example, include computing systems 2070 connected to the intermediate network 2040 and computing systems 2052 connected to local networks 2050 that connect to the intermediate network 2040 (e.g., via edge router(s) 2014 that connect the network 2050 to Internet transit providers). The provider data center 2000 network may also route packets between resources in data center 2000, for example from a VM 2024 on a host 2020 in data center 2000 to other VMs 2024 on the same host or on other hosts 2020 in data center 2000.

A service provider that provides data center 2000 may also provide additional data center(s) 2060 that include hardware virtualization technology similar to data center 2000 and that may also be connected to intermediate network 2040. Packets may be forwarded from data center 2000 to other data centers 2060, for example from a VM 2024 on a host 2020 in data center 2000 to another VM on another host in another, similar data center 2060, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 2018A-2018N, as virtualized resources to customers of a network provider in a similar manner.

Figure 21:
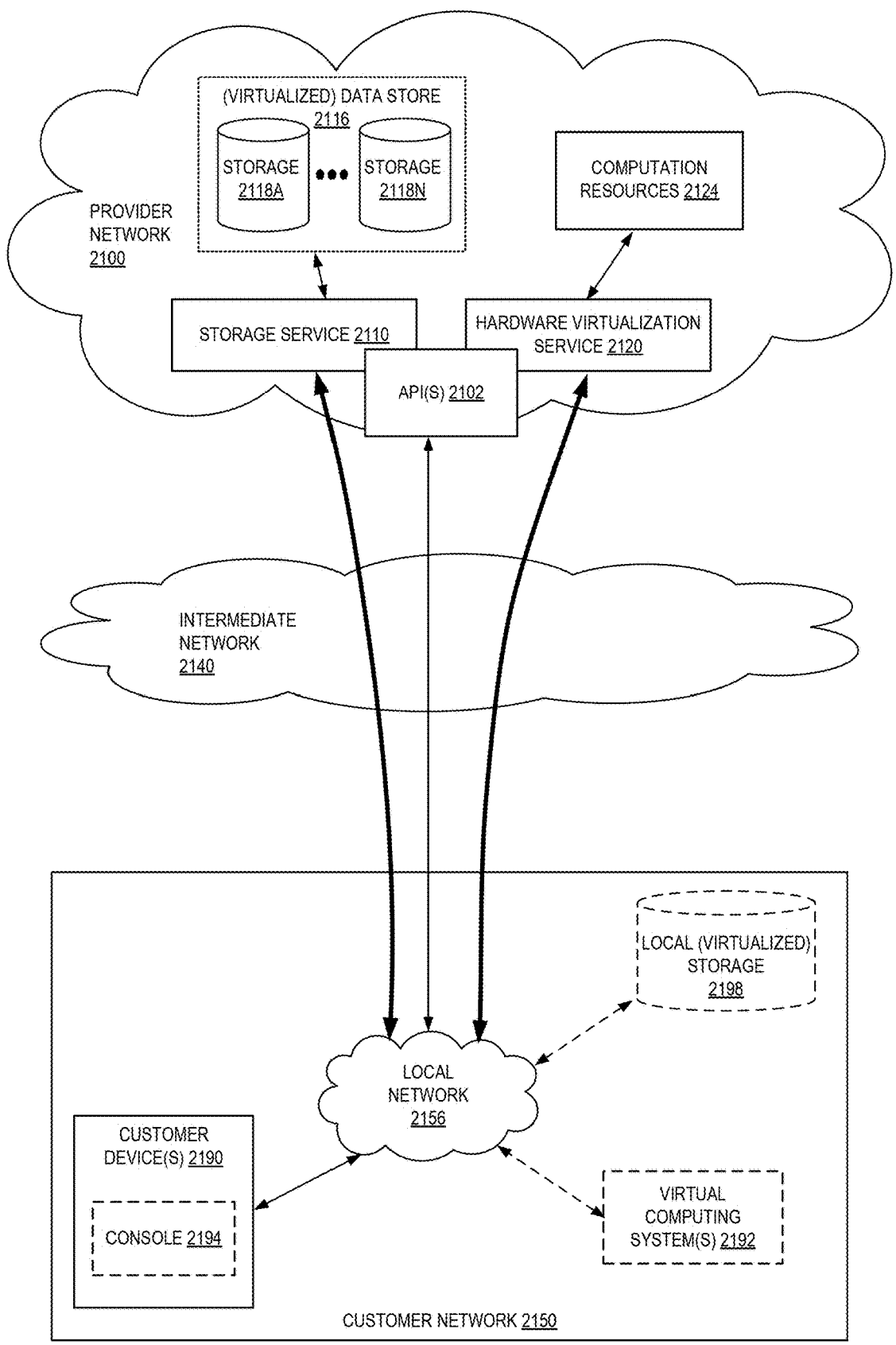
FIG. 21 is a block diagram of an example provider network that provides a storage service and a hardware virtualization service to customers according to some embodiments.

FIG. 21 is a block diagram of an example provider network that provides a storage service and a hardware virtualization service to customers, according to some embodiments. Hardware virtualization service 2120 provides multiple computation resources 2124 (e.g., VMs) to customers. The computation resources 2124 may, for example, be rented or leased to customers of the provider network 2100 (e.g., to a customer that implements customer network 2150). Each computation resource 2124 may be provided with one or more local IP addresses. Provider network 2100 may be configured to route packets from the local IP addresses of the computation resources 2124 to public Internet destinations, and from public Internet sources to the local IP addresses of computation resources 2124.

Provider network 2100 may provide a customer network 2150, for example coupled to intermediate network 2140 via local network 2156, the ability to implement virtual computing systems 2192 via hardware virtualization service 2120 coupled to intermediate network 2140 and to provider network 2100. In some embodiments, hardware virtualization service 2120 may provide one or more APIs 2102, for example a web services interface, via which a customer network 2150 may access functionality provided by the hardware virtualization service 2120, for example via a console 2194 (e.g., a web-based application, standalone application, mobile application, etc.). In some embodiments, at the provider network 2100, each virtual computing system 2192 at customer network 2150 may correspond to a computation resource 2124 that is leased, rented, or otherwise provided to customer network 2150.

From an instance of a virtual computing system 2192 and/or another customer device 2190 (e.g., via console 2194), the customer may access the functionality of storage service 2110, for example via one or more APIs 2102, to access data from and store data to storage resources 2118A-2118N of a virtual data store 2116 (e.g., a folder or "bucket", a virtualized volume, a database, etc.) provided by the provider network 2100. In some embodiments, a virtualized data store gateway (not shown) may be provided at the customer network 2150 that may locally cache at least some data, for example frequently-accessed or critical data, and that may communicate with storage service 2110 via one or more communications channels to upload new or modified data from a local cache so that the primary store of data (virtualized data store 2116) is maintained. In some embodiments, a user, via a virtual computing system 2192 and/or on another customer device 2190, may mount and access virtual data store 2116 volumes via storage service 2110 acting as a storage virtualization service, and these volumes may appear to the user as local (virtualized) storage 2198.

While not shown in FIG. 21, the virtualization service(s) may also be accessed from resource instances within the provider network 2100 via API(s) 2102. For example, a customer, appliance service provider, or other entity may access a virtualization service from within a respective virtual network on the provider network 2100 via an API 2102 to request allocation of one or more resource instances within the virtual network or within another virtual network.

Illustrative System

Figure 22:
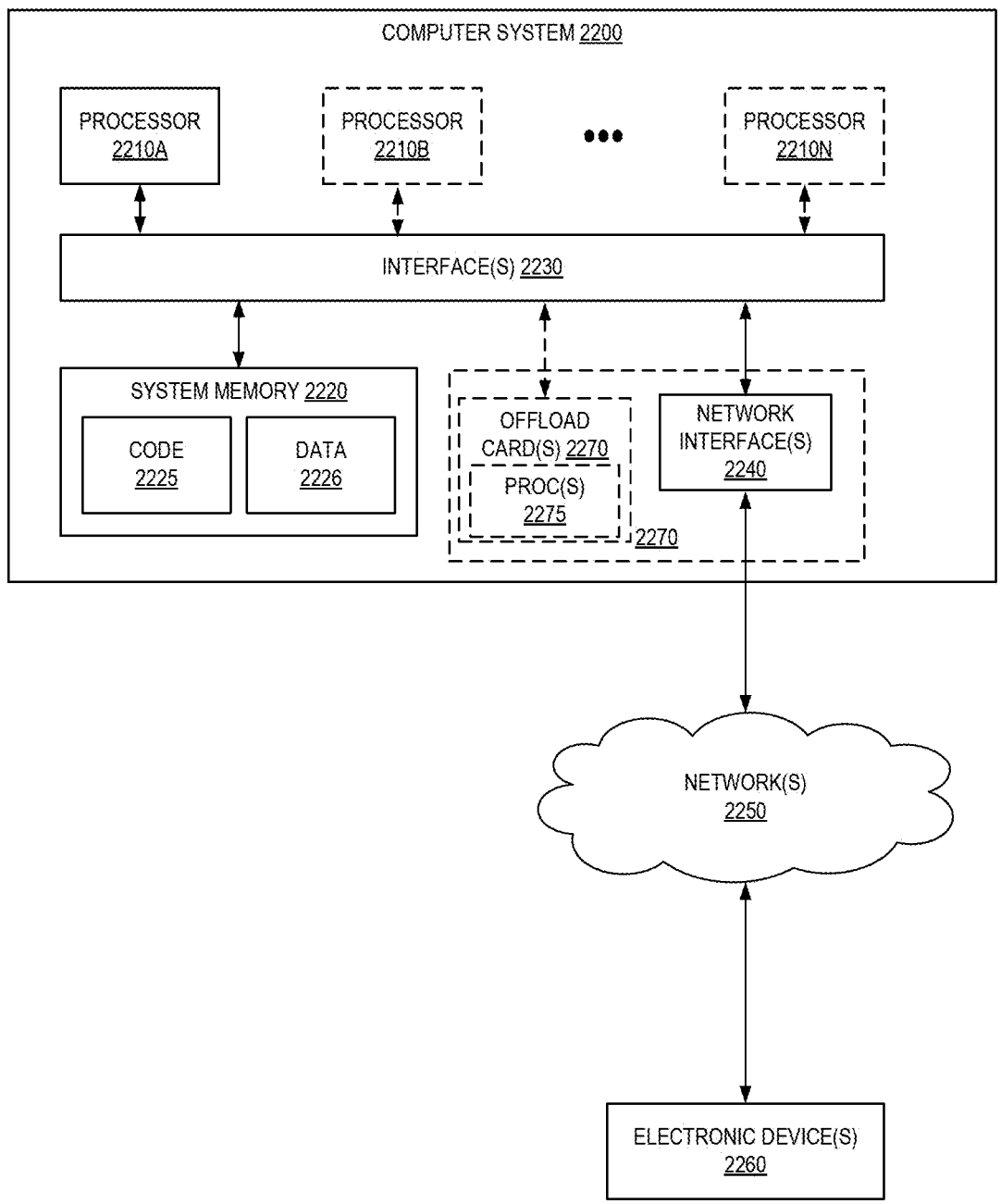
FIG. 22 is a block diagram illustrating an example computer system that may be used in some embodiments.

In some embodiments, a system that implements a portion or all of the techniques for image enhancement as described herein may include a general-purpose computer system that includes or is configured to access one or more computer-accessible media, such as computer system 2200 illustrated in FIG. 22. In the illustrated embodiment, computer system 2200 includes one or more processors 2210 coupled to a system memory 2220 via an input/output (I/O) interface 2230. Computer system 2200 further includes a network interface 2240 coupled to I/O interface 2230. While FIG. 22 shows computer system 2200 as a single computing device, in various embodiments a computer system 2200 may include one computing device or any number of computing devices configured to work together as a single computer system 2200.

In various embodiments, computer system 2200 may be a uniprocessor system including one processor 2210, or a multiprocessor system including several processors 2210 (e.g., two, four, eight, or another suitable number). Processors 2210 may be any suitable processors capable of executing instructions. For example, in various embodiments, processors 2210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 2210 may commonly, but not necessarily, implement the same ISA.

System memory 2220 may store instructions and data accessible by processor(s) 2210. In various embodiments, system memory 2220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 2220 as code 2225 and data 2226.

In one embodiment, I/O interface 2230 may be configured to coordinate I/O traffic between processor 2210, system memory 2220, and any peripheral devices in the device, including network interface 2240 or other peripheral interfaces. In some embodiments, I/O interface 2230 may perform any necessary protocol, timing or other data transformations to convert data signals from one component (e.g., system memory 2220) into a format suitable for use by another component (e.g., processor 2210). In some embodiments, I/O interface 2230 may include support for devices attached through various types of peripheral buses, such as a variant of the Peripheral Component Interconnect (PCI) bus standard or the Universal Serial Bus (USB) standard, for example. In some embodiments, the function of I/O interface 2230 may be split into two or more separate components, such as a north bridge and a south bridge, for example. Also, in some embodiments some or all of the functionality of I/O interface 2230, such as an interface to system memory 2220, may be incorporated directly into processor 2210.

Network interface 2240 may be configured to allow data to be exchanged between computer system 2200 and other devices 2260 attached to a network or networks 2250, such as other computer systems or devices as illustrated in FIG. 1, for example. In various embodiments, network interface 2240 may support communication via any suitable wired or wireless general data networks, such as types of Ethernet network, for example. Additionally, network interface 2240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 2200 includes one or more offload cards 2270 (including one or more processors 2275, and possibly including the one or more network interfaces 2240) that are connected using an I/O interface 2230 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 2200 may act as a host electronic device (e.g., operating as part of a hardware virtualization service) that hosts compute instances, and the one or more offload cards 2270 execute a virtualization manager that can manage compute instances that execute on the host electronic device. As an example, in some embodiments the offload card(s) 2270 can perform compute instance management operations such as pausing and/or un-pausing compute instances, launching and/or terminating compute instances, performing memory transfer/copying operations, etc. These management operations may, in some embodiments, be performed by the offload card(s) 2270 in coordination with a hypervisor (e.g., upon a request from a hypervisor) that is executed by the other processors 2210A-2210N of the computer system 2200. However, in some embodiments the virtualization manager implemented by the offload card(s) 2270 can accommodate requests from other entities (e.g., from compute instances themselves), and may not coordinate with (or service) any separate hypervisor.

In some embodiments, system memory 2220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2200 via I/O interface 2230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 2200 as system memory 2220 or another type of memory. Further, a computer-accessible medium may include transmission media or signals such as electrical, electromagnetic, or digital signals, conveyed via a communication medium such as a network and/or a wireless link, such as may be implemented via network interface 2240.

Figure 23:
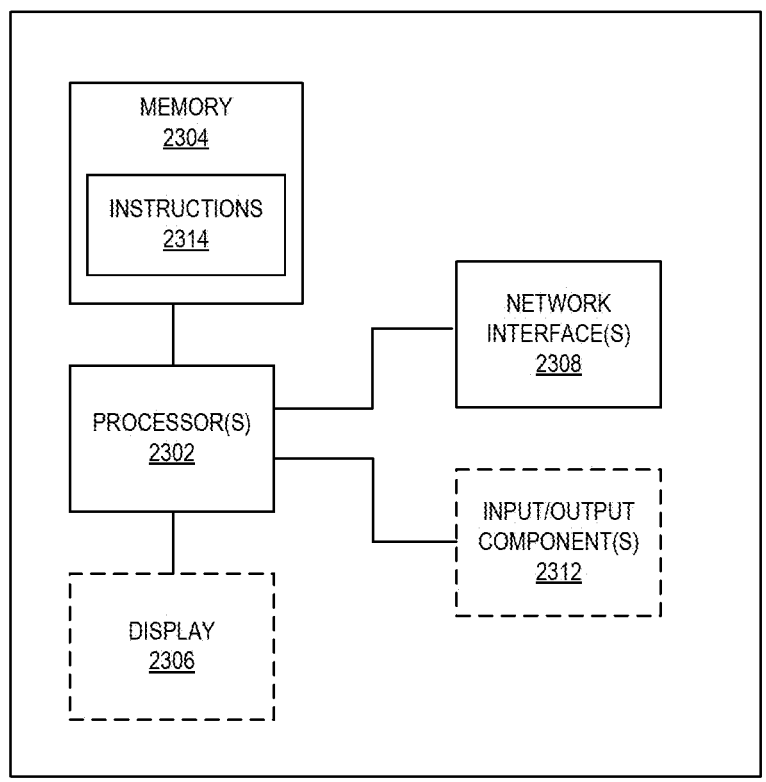
FIG. 23 illustrates a logical arrangement of a set of general components of an exemplary computing device that can be utilized in accordance with various embodiments.

FIG. 23 illustrates a logical arrangement of a set of general components of an example computing device 2300 such as provider network 100, client device(s) 102, etc. Generally, a computing device 2300 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 2302 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 2304) to store code (e.g., instructions 2314) and/or data, and a set of one or more wired or wireless network interfaces 2308 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 2304) of a given electronic device typically stores code (e.g., instructions 2314) for execution on the set of one or more processors 2302 of that electronic device. One or more parts of various embodiments may be implemented using different combinations of software, firmware, and/or hardware.

A computing device 2300 can include some type of display element 2306, such as a touch screen or liquid crystal display (LCD), although many devices such as portable media players might convey information via other means, such as through audio speakers, and other types of devices such as server end stations may not have a display element 2306 at all. As discussed, some computing devices used in some embodiments include at least one input and/or output component(s) 2312 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 24:
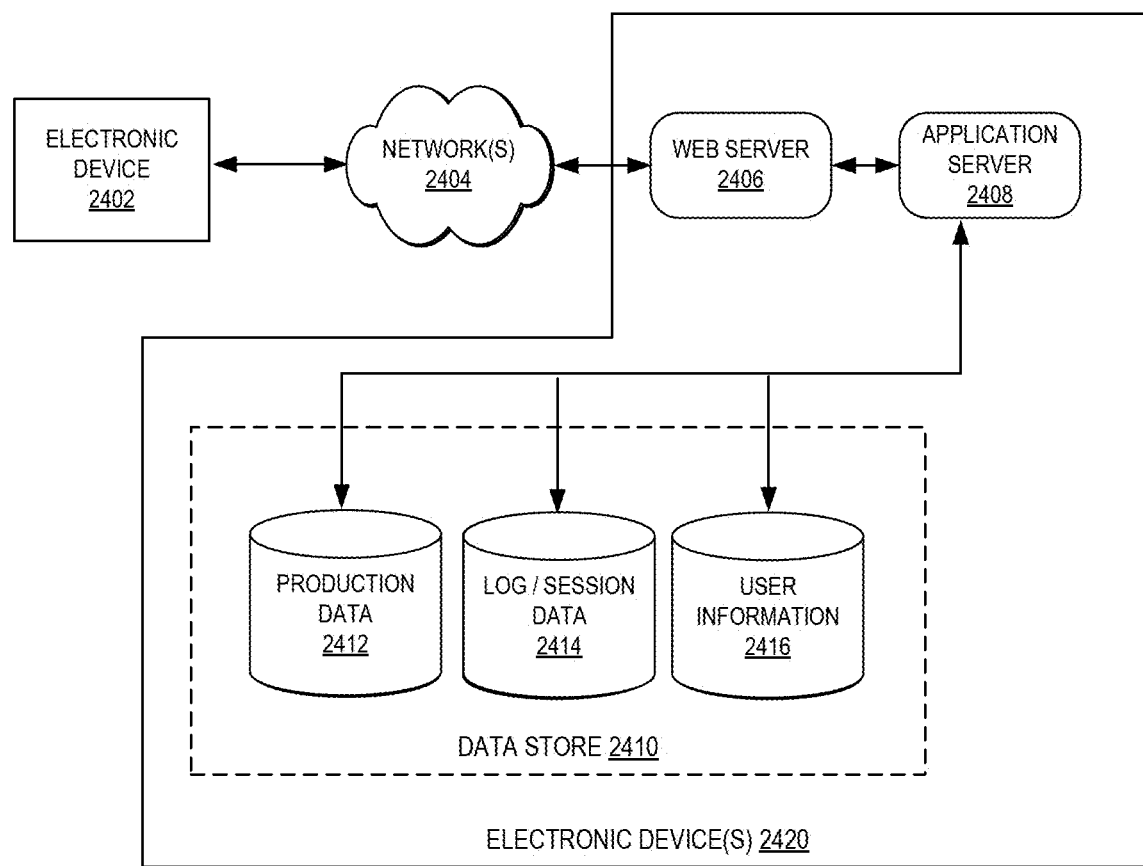
FIG. 24 illustrates an example of an environment for implementing aspects in accordance with various embodiments.

As discussed, different approaches can be implemented in various environments in accordance with the described embodiments. For example, FIG. 24 illustrates an example of an environment 2400 for implementing aspects in accordance with various embodiments. For example, in some embodiments requests are HyperText Transfer Protocol (HTTP) requests that are received by a web server (e.g., web server 2406), and the users, via electronic devices, may interact with the provider network via a web portal provided via the web server 2406 and application server 2408. As will be appreciated, although a web-based environment is used for purposes of explanation, different environments may be used, as appropriate, to implement various embodiments. The system includes an electronic client device 2402, which may also be referred to as a client device and can be any appropriate device operable to send and receive requests, messages or information over an appropriate network 2404 and convey information back to a user of the device 2402. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 2404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 2404 includes the Internet, as the environment includes a web server 2406 for receiving requests and serving content in response thereto, although for other networks an alternative device serving a similar purpose could be used, as would be apparent to one of ordinary skill in the art.

The illustrative environment includes at least one application server 2408 and a data store 2410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 2408 can include any appropriate hardware and software for integrating with the data store 2410 as needed to execute aspects of one or more applications for the client device 2402 and handling a majority of the data access and business logic for an application. The application server 2408 provides access control services in cooperation with the data store 2410 and is able to generate content such as text, graphics, audio, video, etc., to be transferred to the client device 2402, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 2402 and the application server 2408, can be handled by the web server 2406. It should be understood that the web server 2406 and application server 2408 are not required and are merely example components, as structured code discussed herein can be executed on any appropriate device or host machine as discussed elsewhere herein.

The data store 2410 can include several separate data tables, databases, or other data storage mechanisms and media for storing data relating to a particular aspect. For example, the data store illustrated includes mechanisms for storing production data 2412 and user information 2416, which can be used to serve content for the production side. The data store 2410 also is shown to include a mechanism for storing log or session data 2414. It should be understood that there can be many other aspects that may need to be stored in the data store, such as page image information and access rights information, which can be stored in any of the above listed mechanisms as appropriate or in additional mechanisms in the data store 2410. The data store 2410 is operable, through logic associated therewith, to receive instructions from the application server 2408 and obtain, update, or otherwise process data in response thereto. In one example, a user might submit a search request for a certain type of item. In this case, the data store 2410 might access the user information 2416 to verify the identity of the user and can access a production data 2412 to obtain information about items of that type. The information can then be returned to the user, such as in a listing of results on a web page that the user is able to view via a browser on the user device 2402. Information for a particular item of interest can be viewed in a dedicated page or window of the browser.

The web server 2406, application server 2408, and/or data store 2410 may be implemented by one or more electronic devices 2420, which can also be referred to as electronic server devices or server end stations, and may or may not be located in different geographic locations. Each of the one or more electronic devices 2420 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 24. Thus, the depiction of the environment 2400 in FIG. 24 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to enhance one or more frames of a streaming video file;
   receiving a lower-resolution frame of the video to be at least partially enhanced using a trained neural network;
   performing object recognition on the lower-resolution frame to determine a proper subset of the lower-resolution frame to enhance;
   enhancing the proper subset of the lower-resolution frame using the trained neural network according to the request by:
   generating, using a layer of the trained neural network, a residual value based on the proper subset of the received frame and at least one corresponding image portion of a preceding lower resolution frame in the video file and at least one corresponding frame portion of a subsequent lower resolution image in the video file, upscaling at least the proper subset of the received frame using bilinear upsampling, wherein a proper subset is a set less than a whole set, and combining the upscaled proper subset of the received image and residual value to generate an enhanced frame; and outputting the enhanced frame.

2. The computer-implemented method of claim 1, wherein the trained neural network is a convolutional neural network.

3. The computer-implemented method of claim 1, wherein performing object recognition on the lower-resolution frame to determine the proper subset of the lower-resolution image to enhance comprises recognizing one or more of a visage, objects, and edges of objects of the frame.

4. A computer-implemented method comprising:

receiving a request to enhance one or more images of a video file;

receiving a lower-resolution image of the video to be at least partially enhanced using a trained neural network;

enhancing the lower-resolution image using the trained neural network according to the request by applying the trained neural network on the lower-resolution image by:

generating, using a layer of the trained neural network, a residual value based on a proper subset of the received image and at least one corresponding image portion of a preceding lower resolution image in the video file and at least one corresponding image portion of a subsequent lower resolution image in the video file, wherein a proper subset is a set less than a whole set, upscaling the received image using bilinear upsampling, and combining the upscaled received image and residual value to generate an enhanced image; and outputting the enhanced image.

5. The computer-implemented method of claim 4, wherein the trained neural network is a convolutional neural network.

6. The computer-implemented method of claim 4, further comprising:

performing object recognition on the lower-resolution image to determine the proper subset of the lower-resolution image to enhance.

7. The computer-implemented method of claim 4, wherein video file is received over a lower bandwidth connection.

8. The computer-implemented method of claim 4, further comprising:

determining the neural network to perform at least a portion of enhancing the lower-resolution image by using one or more of: object recognition, bandwidth available, power, an acceptable latency, locality information for the image and/or destination viewer, lighting information for the image, and screen resolution.

9. The computer-implemented method of claim 4, further comprising:

merging the output enhanced image with one more non-enhanced images to produce a higher-quality output video.

10. The computer-implemented method of claim 9, further comprising:

enhancing at least a portion of a different image of the video file using a different neural network.

11. The computer-implemented method of claim 4, wherein the received image has encoded information noting which areas of the image to enhance.

12. The computer-implemented method of claim 4, wherein the received image has encoded information noting the image is to be enhanced.

13. The computer-implemented method of claim 4, wherein the request includes at least one of a location of the trained neural network to use, a location of the video file, a desired resolution, and an indication of which images to enhance.

14. The computer-implemented method of claim 4, further comprising:

training the trained neural network using a Pareto front of parameters using an iterative process of:

evaluating a model for the neural network to measure performance, tracking Pareto parameters that provide desired performance for the model, adding gradient values to at least some of the non-Pareto parameters to generate mutated parameters, and re-evaluating the model using the Pareto parameters, the mutated parameters, and the non-mutated, non-Pareto parameters.

15. A system comprising:

storage for a video file;

an image enhancement service implemented by one or more electronic devices, the image enhancement service including instructions that upon execution cause the image enhancement service to:

receive a request to enhance one or more images of the video file, receive a lower-resolution image of the video to be at least partially enhanced using a trained neural network, enhance the lower-resolution image using the trained neural network according to the request by applying the trained neural network on the lower-resolution image to:

generating, using a layer of the trained neural network, a residual value based on a proper subset of the received image and at least one corresponding image portion of a preceding lower resolution image in the video file and at least one corresponding image portion of a subsequent lower resolution image in the video file, wherein a proper subset is a set less than a whole set, upscale the received image using bilinear upsampling, and combine the upscaled received image and residual value to generate an enhanced image, and output the enhanced image.

16. The system of claim 15, wherein the trained neural network is a convolutional neural network.

17. The system of claim 15, wherein the image enhancement service is to perform object recognition on the lower-resolution image to determine the proper subset of the lower-resolution image to enhance.

18. The system of claim 15, wherein the image enhancement service is to merge the output enhanced image with one more non-enhanced images to produce a higher-quality output video.

19. The system of claim 15, wherein video file is received over a lower bandwidth connection.

20. The system of claim 15, wherein the image enhancement service is to determine the neural network to perform at least a portion of enhancing the lower-resolution image by using one or more of: object recognition, bandwidth available, processing power available, power, an acceptable latency, locality information for the image and/or destination viewer, lighting information for the image, and screen resolution.

* * * * *